United States Patent
Yu

(10) Patent No.: US 7,486,614 B2
(45) Date of Patent: Feb. 3, 2009

(54) IMPLEMENTATION METHOD ON MULTI-SERVICE FLOW OVER RPR AND APPARATUS THEREFOR

(75) Inventor: Shaohua Yu, Hubei (CN)

(73) Assignee: Wuhan Fiberhome Networks Co. Ltd., Wuhan, Hubei (CN)

( * ) Notice: Subject to any disclaimer, the term of this patent is extended or adjusted under 35 U.S.C. 154(b) by 679 days.

(21) Appl. No.: 10/521,999

(22) PCT Filed: Jul. 7, 2003

(86) PCT No.: PCT/CN03/00540

§ 371 (c)(1),
(2), (4) Date: Jan. 14, 2005

(87) PCT Pub. No.: WO2004/008710

PCT Pub. Date: Jan. 22, 2004

(65) Prior Publication Data

US 2006/0007854 A1 Jan. 12, 2006

(30) Foreign Application Priority Data

Jul. 17, 2002 (WO) .................... PCT/CN02/00503

(51) Int. Cl.
*H04L 12/42* (2006.01)
*H04L 12/56* (2006.01)
*G06F 15/16* (2006.01)

(52) U.S. Cl. .................. 370/223; 370/395.65; 370/404; 398/4; 709/251

(58) Field of Classification Search ................ 370/223, 370/395.65, 404; 398/4; 709/251
See application file for complete search history.

(56) References Cited

U.S. PATENT DOCUMENTS

| 5,544,161 | A | * | 8/1996 | Bigham et al. | ............... 370/397 |
| 5,684,799 | A | * | 11/1997 | Bigham et al. | ............... 370/397 |
| 5,822,298 | A | * | 10/1998 | Matsumoto et al. | ......... 370/223 |
| 6,041,056 | A | * | 3/2000 | Bigham et al. | ......... 370/395.64 |
| 6,795,446 | B2 | * | 9/2004 | Matsumoto et al. | ......... 370/404 |
| 6,993,047 | B1 | * | 1/2006 | Nigam et al. | ................ 370/473 |
| 7,068,773 | B2 | * | 6/2006 | McCann et al. | ............. 379/229 |

(Continued)

FOREIGN PATENT DOCUMENTS

WO WO9528779 A 10/1995

OTHER PUBLICATIONS

Darwin, "Proposed Draft Standard For Information Technology Telecommunications and information exchange between systems Local and metropolitan area networks Specific requirements—Part 17:Resillient packet ring access method and physical layer Specifications," submitted to IEEE 802.17 as the Proposal, Darwin, Draft 0.3—Jan. 14, 2002.

*Primary Examiner*—Alpus H Hsu
(74) *Attorney, Agent, or Firm*—Fish & Richardson P.C.

(57) ABSTRACT

A data transmission apparatus for implementing multiple service flow in a multiple service ring is described. The apparatus includes a trunk pipe and at least two nodes each with at least one flow. The apparatus also includes a flow Rx framer for converting data received from the flow into data packets of a predetermined protocol, a transmission setup device for setting up information for packets of the predetermined protocol to be transmitted, and a Tx framer for encapsulating the information into frames of the MSR and transmitting the same along the trunk pipe to a downstream neighbor node along the ring.

72 Claims, 12 Drawing Sheets

Tx and Rx Diagram of a Data Node

U.S. PATENT DOCUMENTS

| | | | |
|---|---|---|---|
| 7,277,443 B2 * | 10/2007 | Goode et al. | 370/400 |
| 2004/0105453 A1 * | 6/2004 | Shpak et al. | 370/404 |
| 2004/0184450 A1 * | 9/2004 | Omran | 370/372 |
| 2004/0252688 A1 * | 12/2004 | May et al. | 370/389 |

* cited by examiner

The Scope of patent based on RPR as a MAC client

Tx and Rx Diagram of a Data Node

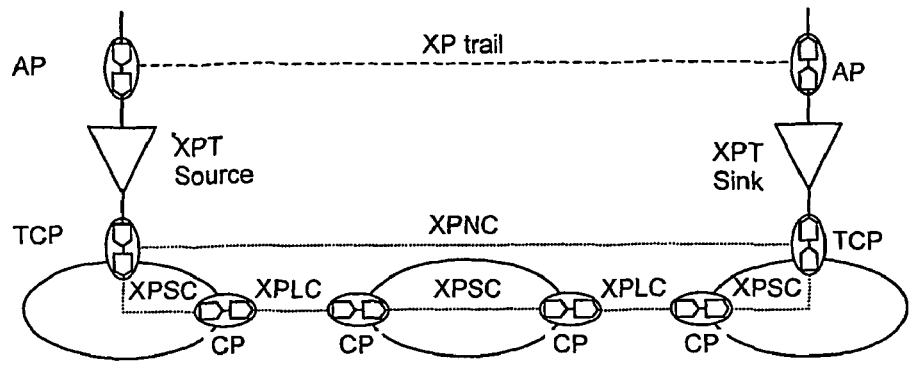
Fig. 3
XP layer network example
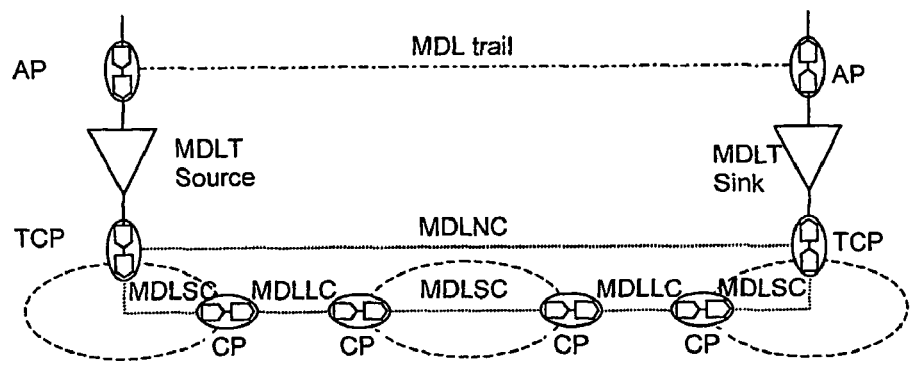
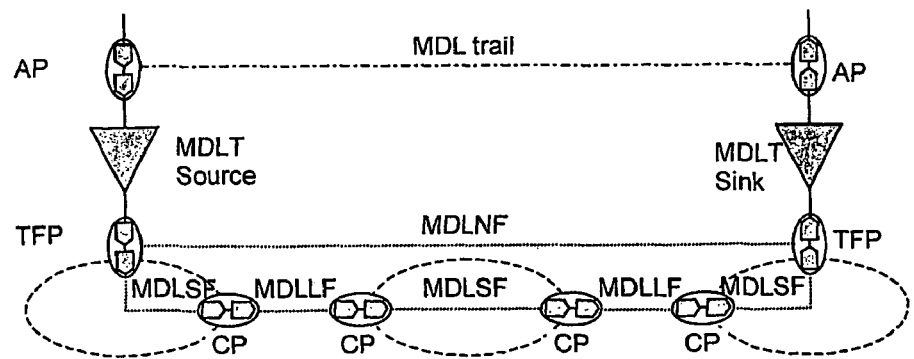
Fig. 4
MDL layer network example
Connection-oriented (upper) / connectionless (bottom)

Client/Server association in a MSF transport ring

XP layer multipoint connection points examples

Flow Based 1+1 Protection

Generic Protocol Stack of MSF Based on RPR

Relationship between XP and RPR MAC, Upper Layer and XP

Protocol type field is 0x88bc assigned by IEEE802.

Generic Frame Format

```
                        0 1 2 3 4 5 6 7 8 9 0 1 2 3 4 5
                       ┌─────┬──────────┬──────────────────┐
TCCR ID =FNi ID +      │ 10  │ 000000B  │ 8-bit Length field│
                       └─────┴──────────┴──────────────────┘
```

+FNj ID +FNk ID+FNm ID ......

Node based multicast Mode

```
                        0 1 2 3 4 5 6 7 8 9 0 1 2 3 4 5
                       ┌─────┬──────────┬──────────────────┐
TCCR ID =FNi ID +      │ 11  │ 000000B  │ 8-bit Length field│
                       └─────┴──────────┴──────────────────┘
```

Node based broadcast Mode

```
                        0 1 2 3 4 5 6 7 8 9 0 1 2 3 4 5
                       ┌─────┬──────────┬──────────────────┐
TCCR ID =FNi ID +      │ 01  │ 000000B  │ 8-bit Length field│   +FNj ID
                       └─────┴──────────┴──────────────────┘
```

Node based unicast Mode

Fig. 10

Expressions of FN ID and TCCR ID

*Note: FNi ID=NAx(x=1,2,3...256)+FT+FNp (p=0,1,2,3,...$2^{20}$-1), to identify the pth Flow with the fixed FT and FN value within ith node. For the case of Multicast/Broadcast Mode, a flow based outgoing packet within a source node can be multicast or broadcast to a designated or source flow (ST) of other sink nodes along a MSF ring or other topologies. Each sink node should have only a source flow to receive this packet from ringlet at a time. If a membership group of multicast or broadcast has been established within a sink node, the said ST will duplicate this packet to other flows with the same membership relation.*

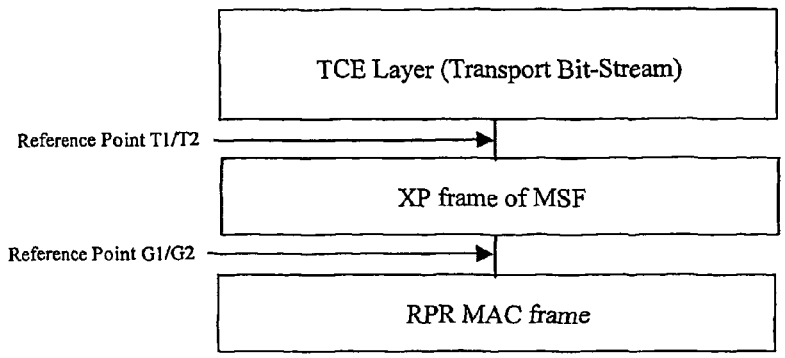

Fig. 11

TDM service channel over MSF

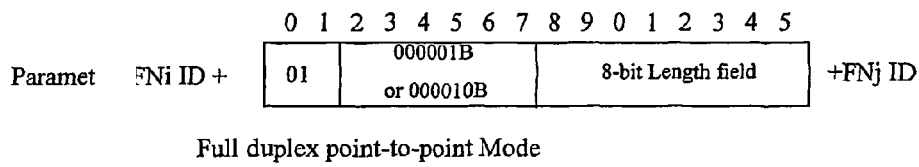

Full duplex point-to-point Mode

Note: FNi ID=NAx(x=1,2,3...256)+FT+FNp (p=0,1,2,3,...$2^{20}$-1), to identify the pth Flow with the fixed FT and FN value within xth node. FNi ID and FNj ID stand for standby and working flow respectively.

Fig. 12

Expressions of 1+1 and 1:1 flow protection parameters

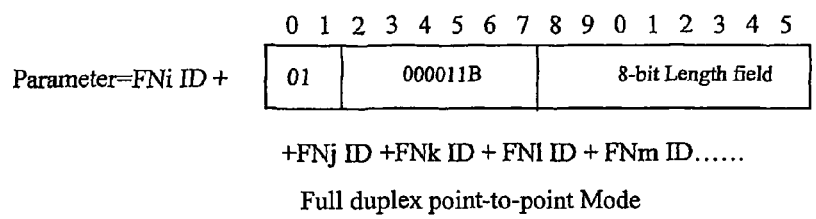

+FNj ID +FNk ID + FNl ID + FNm ID......

Full duplex point-to-point Mode

Note: FNi ID=NAx(x=1,2,3...256)+FT+FNp (p=0,1,2,3,...$2^{20}$-1), to identify the pth Flow with the fixed FT and FN value within xth node. FNi ID is used to present standby flow, and FNi ID, FNk ID, FNl ID and FNm ID etc represent working flow, the total number is N.

Fig. 13

Expressions of 1:N flow protection parameter

Expressions of 1+1 and 1:1 flow protection parameters

Expressions of 1:N flow protection parameter

A MSF Topology, Link-type with Adding and Dropping Flow Services

A MSF Topology, Broadcast Connection to DVB Application

A MSF Topology, Pseudo-mesh Connection

IMPLEMENTATION METHOD ON MULTI-SERVICE FLOW OVER RPR AND APPARATUS THEREFOR

FIELD OF THE INVENTION

The present invention relates to Multiple Services Flow (MSF) Based on RPR and a way of multi-service flow over RPR, and specifically, relates to a data transmission method for implementing multiple service flow in a multiple service ring including a trunk pipe and at least two nodes each with at least one flow, apparatus therefore, and the multiple service ring thus formed.

BACKGROUND ART

The present invention claims the priority of PCT international application No. PCT/CN02/00503 of the same applicant as filed on Jul. 17, 2002 describing a multiple service ring with capabilities of transmitting and switching data, video and voice, therefore all the contents and disclosure of PCT/CN02/00503 are incorporated in the present application as a part of the present application.

RPR is a data network solution developed by IEEE802.17. Regarding network and application issues.

(1) RPR can provides trunk based protection, but could not provide flow based or service based protection within 50 ms. Just like it can provide protection of multiplex section and regeneration section of SDH/SONET, but does not have virtual container or path based protection. (2) RPR can make multicast function of node based and packet based, can not make flow or service based multicast. (3) If RPR provides private-line services and QoS is required, RPR does not have QoS monitoring capabilities for a fixed services targeting to a customer. (4) RPR does not have a capability of providing a service with asymmetrical bandwidth. (5) If a customer needs more bandwidth than a standard bandwidth with granularity ITU-T Recommendation defined. RPR can not implement that, just like three times 100 Mbps. (6) When a customer needs a security filtering function for Layer 2, Layer 3 and layer 4, RPR does not have this function. (7) When a carrier needs loopback testing function of flow based, RPR could not do that. (8) RPR has a good application for two-fibre ring, but for other topologies, just like four-fibre ring, link topology and add/drop flow topology, it still have a problem.

The expansion of business and metro use of data network services are driving the need to deploy data services infrastructure facilities with pre-plan method in the way of flow or service. The dynamic bandwidth allocation and differentiated services over an trunk pipe, flow based bandwidth management, security function, protection, multicast, performance monitoring and their applications in the different topologies are the basic requirements of carrier class.

SUMMARY OF THE INVENTION

The object of the present invention is to develop Multiple services flow based on RPR and to provide the following capabilities:

(1) The Technology encapsulation and transport of Ethernet, Frame Relay, G.702 PDH circuit—Synchronous and asynchronous circuit transport, Video signal, voice-band signal, Digital channel supported by 64 kbit/s-based ISDN etc over a two-fibre ring, a link-type and broadcast topology of fibres.
(2) Service (or flow) based protection of 1+1, 1:1, and 1:N models within 50 ms.
(3) Service (or flow) based multicast and station-based multicast and broadcast.
(4) Bandwidth limitation of service (or flow) based with symmetry and asymmetry.
(5) Flow merging with symmetry and asymmetry.
(6) Line-speed filtering of flow based.
(7) Flow based performance monitoring in 15-minute and 24-hour.
(8) Mirroring of flow.
(9) Frame based transparent PPPoE and PPPoA transport from access to backbone along a MSF ring or other topologies, in order to simplify accounting mechanism (e.g. Radius), reduce maintenance work, and improve latency variation (compared to Layer 2 and Layer 3 switch) in Access network application.

To achieve the above objects, the present invention provides a data transmission apparatus for implementing multiple service flow in a multiple service ring including a trunk pipe and at least two nodes each with at least one flow, said apparatus comprising: a flow Rx framer coupled to said flows for converting data received from said flows into data packets of a predetermined protocol; transmission setup means for setting-up information indicating the destination node address and destination flow for the packets of said predetermined protocol to be transmitted; and a Tx framer for encapsulating said information indicating the destination node address and destination flow and the packets of said predetermined protocol into frames of the multiple service ring and transmitting the same along said trunk pipe to a downstream neighbor node in the ring.

It is preferable that the data transmission apparatus of present invention, of which said predetermined protocol is a XP (processing protocol), further comprises: a Rx framer for receiving and de-framing data frames of the multiple service ring from a upstream neighbour node along said trunk pipe to obtain at least a destination node address and XP packets; and transiting means for transiting the frames destined to other nodes to said Tx framer so as to forward the frames destined to other nodes to a next node.

It is preferable that the data transmission apparatus of present invention further comprises: a destination flow determining means for determining a destination flow of the XP packets for a Universally or Locally administered address; and a flow Tx framer for converting said XP packets for a node with a Universally or Locally administered address from the Rx framer into data of format of local flow and sending the local flow data to a corresponding flow determined by said destination flow determining means.

The present invention further provides a multiple service ring system comprising a plurality of nodes, each node including a data transmission apparatus according to any one of claims 1-34, wherein each of said nodes is assigned a node address(NA), and data incoming to a node contains a destination node address, and said destination node address is XOR'ed with the NA of the local node to check for match or mismatch.

The present invention further provides a data transmission method for implementing multiple service flow in a multiple service ring including a trunk pipe and at least two nodes each with at least one flow, said method comprising: a flow Rx framing step of receiving data from a flow and converting the received data into data packets of a predetermined protocol; a transmission setup step of setting-up information indicating the destination node address and destination flow for the packets of said predetermined protocol to be transmitted; and a Tx framing step of encapsulating said information indicating the destination node address and destination flow and the packets of said predetermined protocol into frames of the multiple service ring and transmitting the same along said trunk pipe to a downstream neighbor node in the ring.

It is preferable that the data transmission method of present invention, of which said predetermined protocol is XP (processing protocol), further comprises: a Rx framing step of receiving and deframing data frames of the multiple service ring from a upstream neighbour node along said trunk pipe to obtain at least a destination node address and XP packets; and a transiting step of transiting the frames destined to other nodes so as to forward the frames destined to other nodes to a next node.

It is preferable that the data transmission method of present invention further comprises: a destination flow determining step of determining a destination flow of the XP packets for a node with a Universally or Locally administered address; and a flow Tx framing step of converting said XP packets for a node with a Universally or Locally administered address into data of format of local flow and sending the local flow data to a corresponding flow determined in said destination flow determining step.

This Patent provides a packet-based transport model to multiple services and multiple topologies for continuation and extension of ITU-T Patent X.85/Y.1321 and X.86/Y.1323. Continued compatibility with all existing requirements and standards from ITU-T and other organizations is required.

BRIEF DESCRIPTION OF THE DRAWINGS

The present invention is illustrated by way of example and not limited by the figures of the accompanying drawings, in which like references indicate similar elements and in which:

FIG. 3 shows a XP layer network example.

FIG. 4 shows a MDL layer network example (Connection-oriented (upper)/connectionless (bottom)).

FIG. 10 shows Expressions of FN ID and TCCR ID.

FIG. 11 shows a TDM service channel over MSF.

FIG. 12 shows Expressions of 1+1 and 1:1 flow protection parameters.

FIG. 13 shows Expressions of 1:N flow protection parameter.

DETAILED DESCRIPTION OF THE PREFERRED EMBODIMENT

Figure 1:
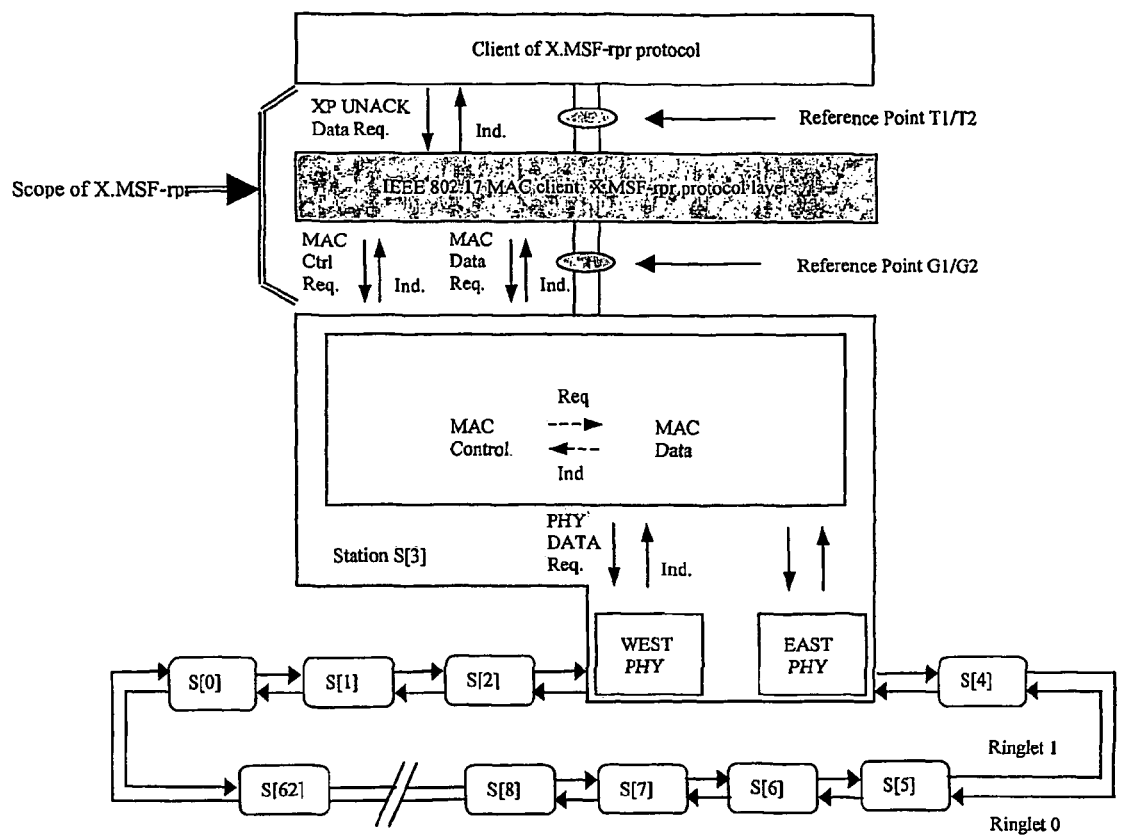
FIG. 1 shows the Scope of patent based on RPR as a MAC client.

This technology handles Multiple Services Flow (MSF) Based on RPR and a way of multi-service flow over RPR. MSF is defined to work at the client of RPR MAC layer and uses Fairness Algorithm (FA) of RPR MAC to support services of Class A, Class B and Class C. MSF is used in configurations where flow based service is managed from provisioning. Architecturally, the link and broadcast topologies are supported also. The features of flow (Service, just like Ethernet, Frame Relay and G.702 etc) based 1+1, 1:1 and 1:N protection within 50 ms, flow (or Service flow) based BW management with symmetry and asymmetry, flow based multicast and Frame Sequence Number for Performance Monitoring of flow are highlighted in this patent.

Key Words of the present application are: Flow based 1+1, 1:1 and 1:N protection within 50 ms, Flow based bandwidth management with symmetry and asymmetry, Flow based multicast, Flow based performance monitoring in the 15-minute and 24-hour, Flow based security, RPR MAC Client, Fairness arithmetic, MAC Destination Address and Source address, Local Destination Address and Source address, Flow Type (FT), Flow Number (FN), Frame Sequence Number (FSN).

The present invention will be described in accordance with the following sequence:

| | |
|---|---|
| 1 | Scope |
| 2 | References |
| 2.1 | ITU-T Recommendations |
| 2.2 | IEEE Specification |
| 3 | Definitions |
| 4 | Abbreviations |
| 4.1 | Abbreviations specified in IEEE 802.17 |
| 4.2 | Abbreviations specified in ITU-T I.321 |
| 4.3 | Abbreviations specified in ETSI |
| 4.4 | Abbreviations used in this Patent |
| 5 | Network framework of Multiple services flow Based on RPR |
| 5.1 | Elements of Ring over MSF |
| 5.2 | Frame Types on a Ring and Multiple Services in Flow |
| 5.3 | Components of a Data Node in MAC Client |
| 5.4. | Reference Point in MAC Client of a Data Node |
| 5.5 | Transport functional architecture of MSF networks |
| 5.6 | Operation of Network Management Frames in MAC Client |
| 5.7 | Fault Management in MAC Client |
| 5.8 | Performance Management in MAC Client |
| 6 | The framework |
| 6.1 | The Technology framework of RPR based Trunk Pipe |
| 6.2 | MSF (client) interface to RPR MAC |
| 6.3 | Flow Adaptation Function Unit |
| 7 | Generic Frame Format |
| 7.1 | Destination Address for use of this Patent |
| 7.2 | Extended protocol field |
| 7.3 | Payload Type (PT) Field |
| 7.4 | Payload FCS Indicator (PFI) Field |
| 7.5 | Reserved Field |
| 7.6 | FT/CS/NM Field |
| 7.7 | Flow Number (FN) Field |
| 7.8 | Reserved Field |
| 7.9 | Frame Sequence Number (FSN) Field |
| 7.10 | HEC Field |
| 7.11 | Payload of XP |
| 7.12 | XP Payload FCS |
| 8 | Loopback function |
| 8.1 | Flow Loopback (TRL) |
| 8.2 | Flow Loopback (TRL) Shortcut |
| 8.3 | Node Reachability Verification (NRV) |
| 8.4 | Node Reachability Verification (NRV) shortcut |

-continued

9   TDM Circuit Emulation (TCE) over MSF
9.1 Introduction
9.2 Technology framework of TDM Circuit Emulation (TCE)
9.3 Services provided by MSF Data link
9.4 Supported Functions of MSF XP for TCE case
9.5 XP Technology involved to support TCE
9.6 Management function involved to support TCE
10  Flow Based Protection (FBP)
10.1 Ethernet Flow Based Protection (TFBP)
10.2 TCE Flow Based Protection (TFBP)
11  Flow Based Multicast (FBM)
12  Bandwidth Policing, Merging and Security of Flow
12.1 Bandwidth Policing of Flow Based with symmetry and asymmetry
12.2 Flow Merging or Bundling with symmetry and asymmetry
12.3 Flow Based Security -- Line-Speed Filtering
13  Topology Application of Link-type and Broadcast Network
13.1 Support of a Link-type with Adding and Dropping Flow Services
13.2 Support of a Broadcast Connection to DVB Application
13.3 Support of a Pseudo-mesh Topology 1 Scope This Patent handles Multiple Services Flow (MSF) Based on RPR and a way of multi-service flow over RPR. MSF is defined to work at the client of RPR MAC layer and uses Fairness Algorithm (FA) of RPR MAC to support services of Class A, Class B and Class C. MSF is used in configurations where flow service is managed such that over provisioning does not occur. Architecturally, the link and broadcast topologies are supported also. The features of flow (Service, just like Ethernet, Frame Relay and G.702 etc, this flow can also be named as tributary service) based 1+1, 1:1 and 1:N protection within 50 ms, flow (Service) based Bandwidth management with symmetry and asymmetry, flow based multicast and Frame Sequence Number for Performance Monitoring of flow are highlighted in this Patent. MSF provides a packet-based transport model to multiple services and multiple topologies.

FIG. 1 Shows the Scope of Patent Based on RPR as a MAC Client.

This patent is based on RPR as a MAC client and is used in configurations where topology and protection is provisioned. What this technology emphasizes is flow, but not a payload of flow; protection (1+1, 1:1 and 1:N) and multicast of flow, but not multicast of MAC; MSF priority, but not MAC priority. The data frame, control frame and network management frame in this technology is all required to map to the payload of RPR data frame. Some control frames RPR defined are also used in this technology, just like topology discovery, protection and FA. All of these frames used in this technology has no relations to and is independent on the control frames (just like frames of topology discovery, fairness, protection) of RPR MAC layer. No change is made for all Ethernet-base protocol (including IEEE 802.3 Ethernet), all PDH standards, Frame Relay standards, G.702/ISDN standards and ETSI DVB specifications. This patent is mainly located at a dual-directional symmetric counter-rotating rings based on RPR.

NOTE 1—It is intended that technology can be extended, in future amendments, to support additional new types of data service.

2 References

The following ITU-T Patents, and other references contain provisions which, through reference in this text, constitute elements of this patent. At the time of publication, the editions indicated were valid. All Patents and other references are subject to revision: all users of this patent are therefore encouraged to investigate the possibility of applying the most recent edition of the Patents and other references listed below. A list of currently valid ITU-T Patents is regularly published.

2.1 ITU-T Patents

[1] ITU-T Patent X.85/Y.1321, IP over SDH using LAPS.
[2] ITU-T Patent X.86/Y.1323, Ethernet over LAPS.
[3] ITU-T Patent X.211 (1995) | ISO/IEC 10022 (1996), Information technology—Open Systems Interconnection—Physical service definition.
[4] ITU-T Patent X.212 (1995) | ISO/IEC 8886 (1996), Information technology—Open Systems Interconnection—Data link service definition.
[5] ITU-T Patent X.200 (1994) | ISO/IEC 7498-1 (1994), Information technology—Open System Interconnection—Basic reference model: The basic model.
[6] ITU-T Patent I.363.1 (1996), B-ISDN ATM Adaptation Layer specification: Type 1 AAL
[7] ITU-T Patent G.805 (2000), Generic functional architecture of transport networks 2.2 IEEE Specifications

[8] IEEE 802.3 *CSMA/CD Access Method and Physical Layer Specifications*, 2002 Edition.
[9] IEEE 802.17, Resilient Packet Ring Access Method & Physical Layer Specifications—*Media Access Control (MAC) Parameters, Physical Layer Interface, and Management Parameters*, October, 2002 Edition.

3 Definitions

For the purposes of this patent, the following definitions apply:

3.1 Trunk Pipe: a physical connection of two adjacent nodes. Trunk pipe is a channel of RPR based on a span of MSF.

3.2 Control Signalling Frame: a frame used to flow multicast or protection etc in a node.

3.3 CT_Request Frame: a frame used to send a configuration table request from Node A to Node B along a MSF ring.

3.4 CT_Response Frame: a frame used to send a configuration table response from Node B to Node A along a MSF ring.

3.5 Configuration Table (CT): a mapping table reflecting the actual value of FT and FN in a node and TCCR between nodes on the MSF ring during engineering operation or project installation phase.

3.6 Configuration Table Inquiry (CTI): a function to get CT from a node. CT_Request frame with a CTI parameter reflecting changing (or updating) part of TCCR of a node on MSF ring is sent to other nodes (called one of them as Node B) by unicast/multicast/broadcast mode from a node (called Node A, e.g. Central station in the most case) by network management interface during normal engineering operation or project installation phase. All nodes received CT_Request frame with a CTI parameter will give a point-to-point response by CT_Response frame with a CTI parameter reflecting actual configuration table of the local node on RPR ring to Node A.

3.7 Configuration Updating Table (CUT): a mapping table reflecting the available value modification of FT and FN in a node and TCCR between nodes on the MSF ring during engineering operation or project installation phase. The incorrect CUT will lead to fault of Flow on MSF ring. CT_Request frame with an CUT parameter reflecting changed (or updating) part of TCCR of all node on MSF ring is sent to other nodes by broadcast mode from a node (e.g. Central station in the most case) by network management interface during normal engineering operation or project installation phase. All nodes received CT_Request frame will build corresponding mapping relations of TCCR in the local node and give a point-to-point response by CT_Response frame to that node sending CT_Request frame. After getting CT_Response frame, that node sourcing CT_Request frame issues a CT_Confirm frame to that remote node sending CT_Response frame.

3.8 Frame Sequence Number (FSN): A modulo used to performance monitoring based on Flow service. This 8-bit field is used to identify Frame Sequence Number (FSN) of Ethernet or TCE data frames in numbered modulo N_fsn=64 (default value, N_fsn is programmable and can be configured to 256 if application needs) from 0 to 63. The field is used to performance monitoring function for packet lost or duplicated of TCE (or Ethernet) based flow. The FSN field will be set to zero if the signalling control frames or network management frames are used.

3.9 Initial Configuration Table (ICT): a mapping table reflecting the initial and available value of FT and FN in a node and TCCR between nodes on the RPR ring during engineering installation or project installation phase. The ICT must be pre-installed before RPR engineering operation or project installation phase. The incorrect ICT will lead to fault of Flow services on RPR ring. CT_Request frame with an ICT parameter reflecting initial TCCR of all nodes on RPR ring is sent to other nodes by broadcast mode from a node (e.g. Central station in the most case) by network management interface during initial engineering operation or project installation phase. All nodes received CT_Request frame will build corresponding mapping relations of TCCR in the local node and give a point-to-point response by CT_Response frame to that node sending CT_Request frame. After getting CT_Response frame, that node sourcing CT_Request frame issues a CT_Confirm frame to that remote node sending CT_Response frame.

3.10 Multiple Services Flow (MSF): a bi-directional symmetric counter-rotating fibre rings, each node could add and drop one or more independent flows.

3.11 Multiple Services Flow over RPR: a bi-directional symmetric counter-rotating fibre rings based on RPR and located at RPR MAC client (refer to FIG. 1), each node could add and drop one or more independent flows or services of class A, Class B and Class C, provisioned topology and protection, IEEE 802.17 frame format, flow service based operation.

3.12 Resilient Packet Ring (RPR): It is defined by IEEE802.17, a high-speed network technology optimised for frame transmission over a redundant ring topology.

3.13 RPR Rx Framer: a RPR MAC framer in Rx side, it terminates a frame of IEEE 802.17 through a station via the ringlet.

3.14 RPR Tx Framer: a RPR MAC framer in Tx side, it sources or passes a frame of IEEE 802.17 through a station via the ringlet.

3.15 XP Data Node: a MSF Node that has an eastward Rx, an eastward Tx, a westward Rx and a westward Tx Trunk Pipe connections along MSF ring, and one or more adding and dropping independent flows. It also has functions of receiving, transmitting and forwarding of network management frame, control signalling and data frame in a Node. The different connection configuration is applied for the different topologies. A dual-ring structure with a pair of unidirectional counter-rotating ringlets is default and major application form.

3.16 X link Protocol (XP): a data link protocol between reference point G1/G2 and reference point T1/T2, used to communication between different MSF nodes. The XP does operate by sending/receiving both data frame and the associated network management/signalling frames to/from an trunk pipe of a node.

3.17 XP Rx Processor: a set of functions used to XP processing in Rx direction. It includes Rx entity after RPR MAC, discrimination of multicast/broadcast, FT/FN value and other associated XP protocol processing.

3.18 XP Tx Processor: a set of functions used to XP processing in Tx direction. It includes Tx entity outgoing to RPR MAC, Tx schedule unit, functions of determination of NA, FT, FN, FCS, multicast/broadcast. The other associated XP Technology processing is also included.

3.19 N_ct: a count of retransmission used to Configuration Table Operation. All nodes on a ring will wait to be assigned ICT during engineering installation phase. After issuing CT_Request frame, Node A will automatically send CT_Request frame again after retransmit Timer_ct (it is programmable) if Node A does not receive corresponding CT_Response frame. It is believed that Node B is not reachable after N times of retransmission (N_ct is programmable also). N_ct is also used by ICT operation.

3.20 Network Management Frame: a frame used to performance and fault monitoring, node configuration management etc along a MSF ring or other different topologies.

3.21 Node Address (NA): an address that identifies a particular station on a network. NA is a OUI MAC address along the RPR ring or other different topologies. IEEE assigns value of 24 bits, manufacturer assigns remaining 22—local indicates a locally administered address. It is the responsibility of the administrator to insure uniqueness.

3.22 Reference Point G1: a reference point between RPR MAC and its client. It stands for processing sink of RPR MAC framer in RPR MAC client side.

3.23 Reference Point G2: a reference point between RPR MAC and its client. It stands for processing source of RPR MAC framer in RPR MAC client side.

3.24 Reference Point T1: a reference point between Flow Rx Framer and XP processor. It stands for processing sink of XP before Flow Rx framer of TCE or Ethernet etc.

3.25 Reference Point T2: a reference point between Flow Tx Framer and XP processor. It stands for processing source of XP after Flow Tx framer of TCE or Ethernet etc.

3.26 Source Flow (ST): a Flow used as multicast/broadcast source in a membership group within a node.

3.27 Timer_ct: a Timer of retransmission used to Configuration Table Operation. A node after first power-on or during the phase needed to change configuration table on a ring will wait to be assigned ICT during configuration modification or project installation phase. After issuing CT_Request frame, Node A will automatically send CT_Request frame again after retransmission Timer_ct (it is programmable) if Node A does not receive corresponding CT_Response frame. It is believed that Node B is not reachable after N_ct times of retransmission (N_ct is programmable also). N_ct is also used by CUT operation.

3.28 Transit: a passing of a frame through a station via the ringlet.

3.29 Flow: an independent adding/dropping flow (or service) channel to/from a data nodes, just like a series "Private Line or Private Circuit for Renting from Carrier". Flow can be multi-service with a constant bandwidth of symmetry and asymmetry. The different flow can be assigned to different priority.

3.30 Flow Adaptation Function Unit: an adaptation function from/to various independent flow type signals to/from reference point T1/T2. It has Flow Adaptation Source Function and Flow Adaptation Sink Function. A Sink corresponds to reference point T1, a source to reference point T2. This adaptation function can include the signal and rate transform, synchronous function between two sides of peer.

3.31 Flow Cross-connection Relationship (TCCR): a table reflecting Flow cross-connection relationship of all nodes on a ring or other topologies. It is global table of a dual-ring structure or other topologies, that is, source and sink connection relationship of all available flows.

3.32 Flow Membership Copy: a duplicate function implementation from Source Flow (ST) to every Flow in the corresponding membership group within a node.

3.33 Flow Multicast/Broadcast: a discriminator of distinguishing unicast or Multicast/Broadcast packets while a packet is coming up from a RPR Rx Framer via the ringlet, so as to provide TBM function. The TBM Function Unit built in a Node is defined to support one or more independent hierarch of multicast possibly involved the same or different FT at the same time. TBM Function Unit implements a duplication function within a node (station) from a Flow getting a payload of a frame from the related topologies to other multiple Flow with the same FT value and with being set to have a relation of membership group. A group of FN with the same FT value within a Node can be set to become a membership group of multicast/broadcast. It is required that a designated Flow in the membership group should receive data frames at the reference point G1 from the related topologies (A designated Flow in the membership group is only allowed to get packet from ST, and is not permitted to receive all other packets). This patent defines this designated Flow as a Source Flow (ST). Once getting data frames, the ST duplicates those frames to every Flow in the corresponding membership group within a node. The ST should be set and designated to a given value of FT and FN by network management entity during the project installation phase or on-line operation phase. The one or more STs can be designated or changed dynamically within a node according to the customer requirements.

3.34 Flow Rx Framer: an abstract of physical framer of Flow at Rx side, it stands for a framer of TCE or Ethernet framer.

3.35 Flow Tx Framer: an abstract of physical framer of Flow at Tx side, it stands for a framer of TCE or Ethernet framer.

3.36 Flow Number (FN): a number of same types of Flow Port on a node. This number is 7 if the 7th ISDN is provided in a node.

3.37 Flow Type (FT): a type of an independent adding/dropping flow channel to/from the RPR data nodes. This type can be TCE service.

3.38 Tx Schedule: a control function for transmitted frame in a node according to the priority level of (a) forwarded frames from upstream node, (b) multicast/broadcast frames and (c) transmitted frame from the local station. If there are several frames to be sent in a node at the same time, the schedule unit will check priority of frame and decide which frame will go first to the downstream along the ringlet.

3.39 XP Rx Processor: a set of logical functions used to XP processing in Rx direction. It includes Rx entity from RPR MAC between reference point G1/G2 and T1/T2, discrimination of multicast/broadcast based on Flow, FT/CS/NM value, FN value, FSN value and other associated XP Technology processing.

3.40 XP Tx Processor: a set of logical functions used to XP processing in Tx direction. It includes Tx entity outgoing to RPR MAC, Tx schedule unit, functions of determination of NA, TTL, FT, FN and FSN, multicast/broadcast from the view of RPR MAC layer. The other associated XP protocol processing is also included.

3.41 1+1 protection (flow based, unidirectional): a 1+1 protection architecture has one normal traffic signal (packet), one working flow, one protection flow and a logical bridge. At the source side, the normal traffic signal (packet) is logically bridged to both the working and protection flow. At the sink side, the normal traffic signal (packet) is selected from the better of the two flows. Due to the logical bridging, the 1+1 architecture does not allow an extra unprotected traffic signal (packet) to be provided.

3.42 1:N protection (flow based, unidirectional): a 1:N protection architecture has N normal traffic signals (packet), N working flows and 1 protection flow which may have 1 extra traffic signal (packet) in case of no defect condition (or a fault indication) or external commands for the N working flows. The signals (packet) on the working flows are the normal traffic signals (packet). The signal (packet) on the protection flow may be either one of the normal traffic signals (packet), an extra traffic signal (packet), or the null signal (packet) (e.g. an all-ONEs signal, a test signal (packet), one of the normal traffic signals (packet)). At the source side, one of these signals (packet) is connected to the protection flow. At the sink side, the signals (packet) from the working flows are selected as the normal signals (packet). When a defect condition or a fault indication is detected on a working flow or under the influence of certain external commands, the transported signal (packet) is bridged to the protection flow. At the sink side, the signal from this protection flow is then selected.

3.43 Automatic Protection Switching (APS, flow based) within 50 ms: autonomous switching of a signal (packet) from a failed working flow to a protection flow when a defect condition or a fault indication is detected on a working flow or under the influence of certain external commands and subsequent restoration using control signals carried by the corresponding control signaling packet.

4 Abbreviations 4.1 Abbreviations Specified in IEEE 802.17

This Patent makes use of the following abbreviations specified in IEEE 802.17:

| | | |
|---|---|---|
| (1) | DA | Destination Address |
| (2) | FCS | Frame Check Sequence |
| (3) | FE | Fairness Eligible |
| (4) | HEC | Header Error Check |
| (5) | IEEE | Institute of Electrical and Electronics Engineers |
| (6) | LAN | Local Area Network |
| (7) | MAC | Medium Access Control |
| (8) | MAN | Metropolitan Area Network |
| (9) | MIB | Management Information Base |
| (10) | MTU | Maximum Transfer Unit |
| (11) | OUI | Organizationally Unique Identifier |
| (12) | PDU | Protocol Data Unit |
| (13) | PHY | Physical Layer |
| (14) | POS | Packet Over SONET |
| (15) | PT | Protocol Type |
| (16) | RI | Ringlet Identifier |
| (17) | SA | Source Address |
| (18) | SDU | Service Data Unit |
| (19) | SNMP | Simple Network Management Protocol |
| (20) | SPI | System Packet Interface |
| (21) | TTL | Time-To-Live |
| (22) | WAN | Wide Area Network |
| (23) | WTR | Wait To Restore |

4.2 Abbreviations Specified in ITU-T I.321

This Patent makes use of the following abbreviations specified in ITU-T Patent:

a) ATM Asynchronous Transfer Mode 4.3 Abbreviations Specified in ETSI

This Patent makes use of the following abbreviations specified in ETSI Patent EN 300 429:

a) DVB Digital Video Broadcast 4.4 Abbreviations Used in this Patent

| | | |
|---|---|---|
| 1) | AP | Access Point |
| 2) | CP | Connection Point |
| 3) | CS | Control Signalling |
| 4) | CT | Configuration Table |
| 5) | CTI | Configuration Table Inquiry |
| 6) | CUT | Configuration Updating Table |
| 7) | EFBP | Ethernet Flow Based Protection |
| 8) | ICT | Initial Configuration Table |
| 9) | LMXP | Layer Management of X link Protocol |
| 10) | LSFFU | Line-Speed Filtering Function Unit |
| 11) | MAC | Media Access Control |
| 12) | MDL | MAC Data Link Layer |
| 13) | MDLLC | MDL Link Connection |
| 14) | MDLLF | MDL Link Flow |
| 15) | MDLNC | MDL Network Connection |
| 16) | MDLNF | MDL Network Flow |
| 17) | MDLSC | MDL Subnetwork Connection |
| 18) | MDLSF | MDL Subnetwork Flow |
| 19) | MDCT | MDL Trail Multipoint Connection Point |
| 20) | MPCP | Multipoint Connection Point |
| 21) | MSF | Multiple Services Flow |
| 22) | MSF-RPR | Multiple Services Flow over RPR |
| 23) | NA | Node Address of Resilient Packet Ring |
| 24) | NM | Network Management |
| 25) | NRV | Node Reachability Verification |
| 26) | PFI | Payload FCS Indication |
| 27) | PLAS | Pure Local Address Structure (32-bit) |
| 28) | PT | Payload Type |
| 29) | OAM | Operation, Administration and Maintenance |
| 30) | RPR | Resilient Packet Ring |
| 31) | Rx | Receive data |
| 32) | ST | Source Flow |
| 33) | TBM | Flow Based Multicast |
| 34) | FBP | Flow Based Protection |
| 35) | TCCR | Flow Cross-Connection Relationship |
| 36) | TCE | TDM Circuit Emulation |
| 37) | TCP | Termination Connection Point |
| 38) | TFP | Termination Flow Point |
| 39) | TDM | Time Division Multiplex |
| 40) | TMG | Flow Merging Group |
| 41) | TRL | Flow Loopback |
| 42) | TFBP | TCE Flow Based Protection |
| 43) | FN | Flow Number |
| 44) | FT | Flow Type |
| 45) | Tx | Transmission data |
| 46) | U/M/B | Unicast/Multicast/Broadcast |
| 47) | XP | X link Protocol entity as a RPR MAC client |
| 48) | XPLC | XP Link Connection |
| 49) | XPNC | XP Network Connection |
| 50) | XP-PDU | XP-Protocol Data Unit |
| 51) | XP-SAP | XP-Service Access Point |
| 52) | XPSC | XP Subnetwork Connection |
| 53) | XP-SDU | XP-Service Data Unit |
| 54) | XPT | XP Trail |

5 Network Framework of Multiple Services Flow Based on RPR 5.1 Elements of Ring over RPR MAC MSF based on RPR employs a dual-ring structure consisting of a pair of unidirectional count-rotating ringlets, more than one nodes of each with RPR MAC, RPR MAC Client and at least one Flow. "MSF-RPR" uses OUI MAC addresses and the multicast address in support of flow services and uses RPR frame format that allows this patent to define payload within an Ethertype. MSF uses Fairness Algorithm (FA) to support services of Class A, Class B and Class C. This patent is used in configurations where flow service is managed by provisioning. Architecturally, the link, broadcast topologies are supported also. Each node could add and drop one or more independent flows (e.g. DVB port) and control signalling frames and network management frames. This patent supports multicast and broadcast of these Flow service and forwarding data packets.

5.2 Frame Types on a Ring and Multiple Service in Flow

Each node has ability of adding and dropping one or more independent Flow services defined in Table 1.

TABLE 1

Types of multi-service in Flow

| Flow types | Capabilities | | |
|---|---|---|---|
| TCEs | Full duplex point-to-point | Multicast of node based | Broadcast of node based |
| Ethernet | Full duplex point-to-point | Multicast of node based | Broadcast of node based |

Note 1:
The bandwidth of trunk pipe depends on deployment service requirements, the trunk Flow bandwidth be half of the trunk pipe bandwidth to provide protection bandwidth availability where needed. Where services requirements allow the trunk of Flow bandwidth can exceed the trunk bandwidth.
Note 2:
Multicast is half duplex point-to-multipoint of node based, Broadcast is half duplex point of node based to all other points on a ring.

Transmitted and received frames on a ring have (1) frames of multi-service station by station, (2) control signalling frame and (3) network management frame specified in Table 2, to show full capabilities of point-to-point, multicast and broadcast along a ring.

TABLE 2

Frame types

| Frame types | Capabilities | | |
|---|---|---|---|
| Frames of multi-service station by station | Point-to-point | Multicast | Broadcast |
| Control Signalling Frame | Point-to-point | Multicast | Broadcast |
| Network Management Frame | Point-to-point | Multicast | Broadcast |

Figure 2:
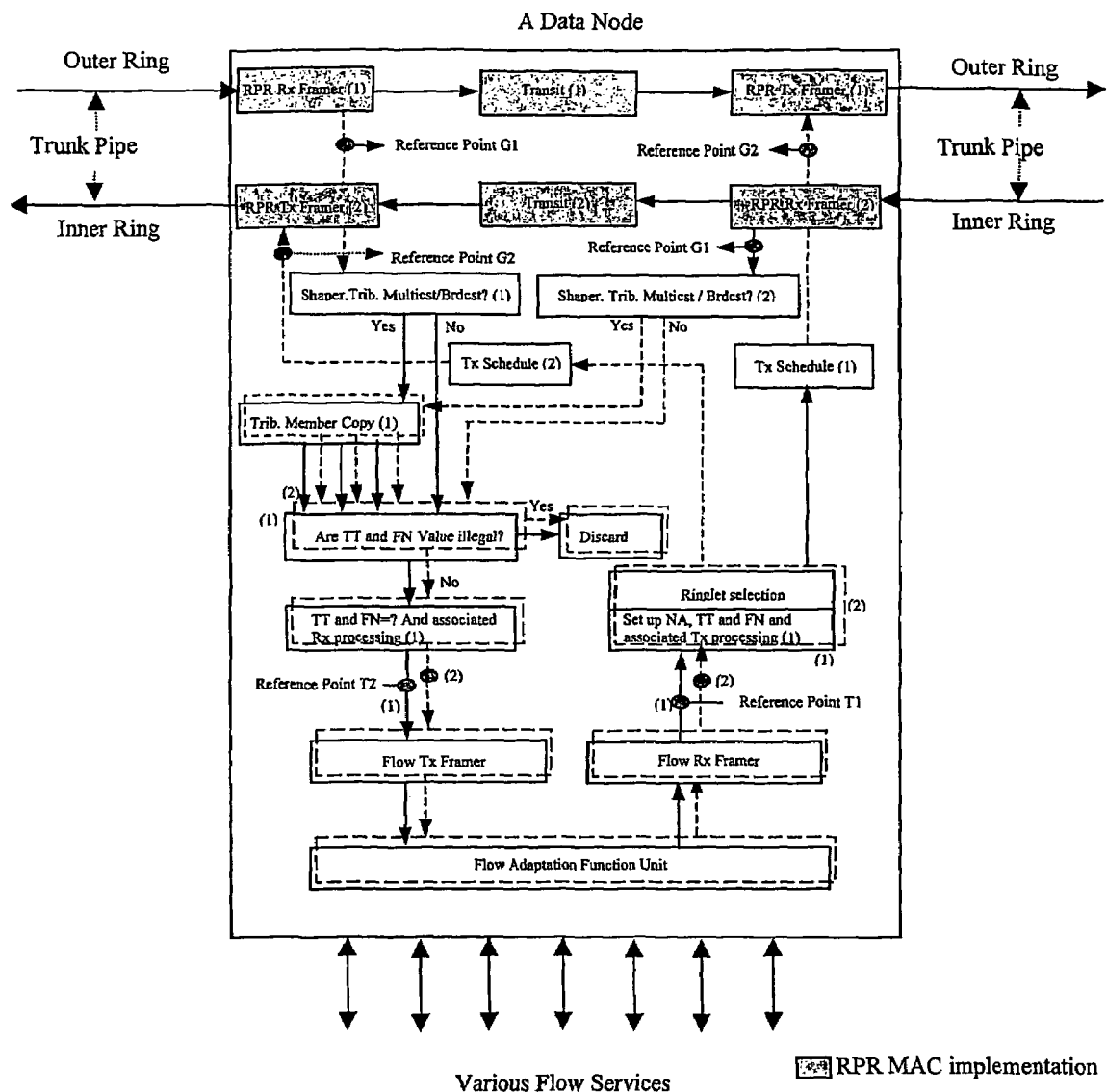
FIG. 2 shows Tx and Rx Diagram of a Data Node.

FIG. 2 Shows Tx and Rx Diagram of a Data Node.

5.3 Components of a Data Node in MAC Client

A MSF data node is the system equipment that has an eastward Rx, eastward Tx, westward Rx and westward Tx Trunk Pipe connections, and one or more adding and dropping independent Flows over RPR MAC. MSF node also has functions of receiving, transmitting and forwarding of network management frame, control signalling and data frame within a Node. The corresponding change should be made as the different connection configuration is applied for the different topologies. The basic components and elements of a node are as follows.

5.3.1 Trunk Pipe: a physical connection of two adjacent MSF nodes.

5.3.2 Flow: an independent adding/dropping flow channel to/from the MSF data nodes, just like a series "Private Line or Private Circuit for Renting from Carrier". Flow can be a G.702 ports. The different flow can be assigned to different priority.

5.3.3 Inner Ring: an inner single ring of RPR.

5.3.4 Outer Ring: an outer single ring of RPR.

5.3.5 MAC Client: The layer entity of XP that invokes the MAC service interface.

5.3.6 Transit: a passing of a frame through a station via the ringlet.

5.3.7 Schedule Unit: a control function for transmitted frame within a node according to the priority level of forwarded frames from upstream station, multicast/broadcast frames and transmitted frame from the local station. If there are several frames to be sent within a node at the same time, the schedule unit will decide which frame will delivery first to the downstream along the ring.

5.3.8 RPR Rx Framer: a RPR MAC framer in Rx side, it terminates a frame of IEEE 802.17 through a station via the ringlet.

5.3.9 RPR Tx Framer: a RPR MAC framer in Tx side, it terminates a frame of IEEE 802.17 through a station via the ringlet.

5.3.10 Flow Rx Framer: an abstract of physical framer of Flow at Rx side, it stands for a framer of TCE, Frame Relay or Ethernet framer.

5.3.11 Flow Tx Framer: an abstract of physical framer of Flow at Tx side, it stands for a framer of TCE, Frame Relay or Ethernet framer.

5.3.12 XP Rx Processor: a set of logical functions (of RPR MAC client) used to XP processing in Rx direction. It includes Rx entity to get packets from RPR MAC, discrimination of multicast/broadcast based on flow, FT/CS/NM value, FN value, FSN value and other associated XP protocol processing.

5.3.13 XP Tx Processor: a set of logical functions (of RPR MAC client) used to XP processing in Tx direction. It includes Tx entity outgoing to RPR MAC, Tx schedule unit, functions of determination of NA, TTL, FT/CS/NM, FN and FSN, multicast/broadcast from the view of RPR MAC layer. The other associated XP protocol processing is also included.

5.3.14 Addressing (48 bit OUI): The IEEE 48 bit OUI is generally used as MAC addresses. It contains: Individual/Group bit—identifies unicast and multicast/broadcast frames, Universal/Local bit—indicates that the address was assigned by IEEE and the manufacturer and should be unique, IEEE assigns value of 24 bits, manufacturer assigns remaining 22—local indicates a locally administered address. It is the responsibility of the administrator to insure uniqueness. MSF will use universal address and the broadcast address in support of flow services.

5.4 Reference Point in MAC Client of a Data Node

The four different Reference Points are defined in a node.

5.4.1 Reference Point G1: a reference point between RPR MAC and its client. It stands for processing sink of RPR MAC framer in RPR MAC client side.

5.4.2 Reference Point G2: a reference point between RPR MAC and its client. It stands for processing source of RPR MAC framer in RPR MAC client side.

5.4.3 Reference Point T1: a reference point between Flow Rx Framer and XP processor. It stands for processing sink of XP before Flow Rx framer of TCE or Ethernet etc.

5.4.4 Reference Point T2: a reference point between Flow Tx Framer and XP processor. It stands for processing source of XP after Flow Tx framer of TCE or Ethernet etc.

5.5 Transport Functional Architecture of MSF Networks 5.5.1 General

The functional architecture of MSF transport networks is described using the generic rules defined in Patent G.805. The specific aspects regarding the characteristic information, client/server associations, the topology, the connection supervision and multipoint capabilities of MSF transport networks are provided in this Patent.

In a MSF network two levels of multiplexing are used. A node-level multiplexing is used to trunk multiple packet flows in a single network element. A unique tag (flow number) is used to distinguish between client flows/connections. A ring level MAC layer is used to multiplex trunks from multiple nodes on a shared ring.

MSF is defined in a modular way; hence a variety of MAC protocols can serve the XP layer. RPR could be one realization of the MAC layer. In that case the Destination MAC address field is used to perform the multiplexing function.

5.5.2 MSF Layer Networks

Two layer networks are defined in the MSF transport network architecture:
XP Layer Network.
MAC/Data-Link Layer (MDL) Network. The MDL layer could be either connection-oriented or connectionless.

The XP layer network is a path layer network. The MDL layer network is a section layer network.

A MSF packet consists of payload, XP header and MDL header.

5.5.2.1 XP Layer Network

The XP layer network provides the transport of adapted information through a XP trail between XP access points. The adapted information is a non-continuous flow client frames (the minimum and maximum frame size is protocol dependent). The XP layer network characteristic information is a non-continuous flow of adapted information extended with XP header (see 5.5.2.1.2), and CS or NM packets. The XP layer network contains the following transport processing functions and transport entities:

XP trail.
XP trail termination source (XPT source): generates CS or NM packets.
XP trail termination sink (XPT sink): terminates CS or NM packets.
XP network connection (XPNC).
XP link connection (XPLC).
XP subnetwork connection (XPSC).

FIG. 3 Shows a XP Layer Network Example.

5.5.2.1.1 XP Trail Termination

The XP trail termination source accepts adapted information at its input, add the flow traffic, inserts CS or NM packets and presents the characteristic information of the XP layer network at its output. The XP trail termination source can be used without binding its input to an adaptation function, e.g. for testing purposes.

The XP trail termination sink accepts the characteristic information of the XP layer network at its input, terminates the flow traffic, extracts the CS or NM packets and presents the adapted information at its output.

The XP trail termination (XPT) consists of a co-located XP trail termination source and sink pair.

5.5.2.1.2 XP Header Format

Please refer to section 7.

5.5.2.2 MDL Layer Network

The MDL layer network provides the transport of adapted information through an MDL trail between access points. The adapted information is a non-continuous flow of XP layer network characteristic information plus the flow number. The MDL layer network characteristic information is a non-continuous flow of adapted information and OAM information. The MDL layer network contains the following transport processing functions and transport entities (see FIG. 3):

MDL trail.
MDL trail termination source (MDLT source): generates CS or NM packets.
MDL trail termination sink (MDLT sink): terminates CS or NM packets.
MDL network connection/flow (MDLNC/MDLNF).
MDL link connection/flow (MDLLC/MDLLF).
MDL subnetwork connection/flow (MDLSC/MDLSF).

FIG. 4 Shows a MDL Layer Network Example (Connection-oriented (Upper)/Connectionless (Bottom)).

5.5.2.2.1 MDL Trail Termination

The MDL trail termination source accepts adapted information at its input, inserts CS or NM packets and presents the characteristic information of the MDL layer network at its output. The MDL trail termination source can be used without binding its input to an adaptation function, e.g. for testing purposes.

The MDL trail termination sink accepts the characteristic information of the MDL layer network at its input, removes the CS or NM packets and presents the adapted information at its output.

The MDL trail termination (MDLT) consists of a co-located MDL trail termination source and sink pair.

5.5.3 Client/Server Associations

A key feature of the MSF transport assembly provides the information transfer capability required to support various types of services of different bit rates by various server layers.

In terms of client/server associations, the MSF transport assembly offers a XP trail and uses a trail in a server layer network. This is illustrated in FIG. 5.

Figure 5:
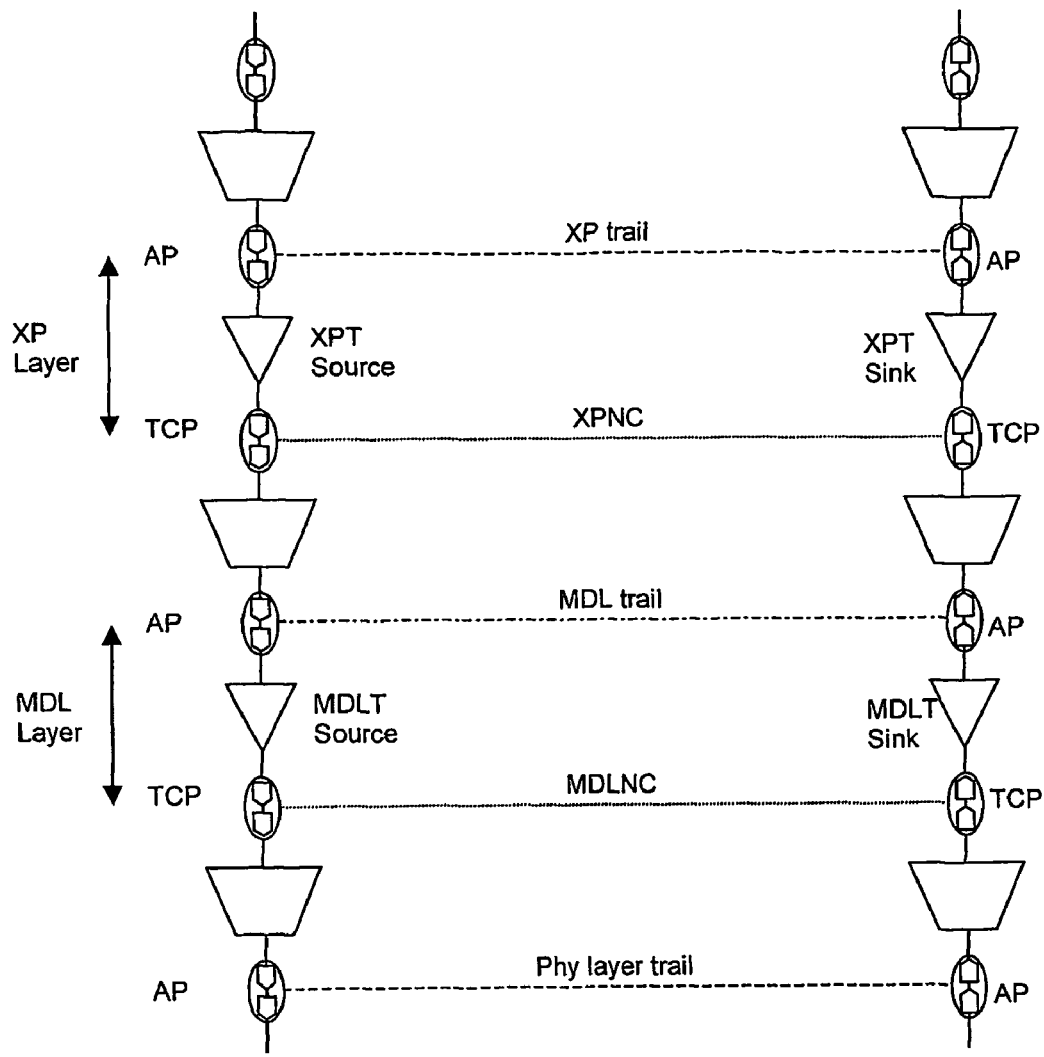
FIG. 5 shows a Client/Server association in a MSF transport ring.

FIG. 5 Shows a Client/Server Association in a MSF Transport Ring.

5.5.3.1 XP/Client Adaptation

The XP/Client adaptation is considered to consist of two types of processes: client-specific processes and server-specific processes.

Client-specific processes includes

Detection of client defects. Two generic types of defects are
    Loss of Client Signal
    Loss of Client Synchronization Service-specific XP/Client adaptation source performs the following functions between its input and its output:
    Adding XP header.

Service-specific XP/Client adaptation sink performs the following functions between its input and its output:
    Remove XP header.

The bi-directional XP/Client adaptation function is performed by a co-located pair of source and sink XP/Client adaptation functions.

5.5.3.2 MDL/XP Adaptation

The MDL/XP adaptation source performs the following functions between its input and its output:
    Packet multiplexing,
    Adding MDL header.

The MDL/XP adaptation sink performs the following functions between its input and its output:
    Packet demultiplexing according to flow number value,
    MDL header extraction.

The MDL/XP adaptation consists of a co-located MDL/XP adaptation source and sink pair.

5.5.3.3 MDL/Physical Layer Adaptation

Beyond the scope of this Patent.

5.5.4 Topology

MSF supports unicast, half-duplex multicast and broadcast connections.

In half-duplex multicast service, traffic from single source port is multicasted to several sink ports.

5.5.4.1 Multipoint Connection Point (MPCP)

The MPCP is a reference point that binds CP or a set of CPs.

Figure 6A:
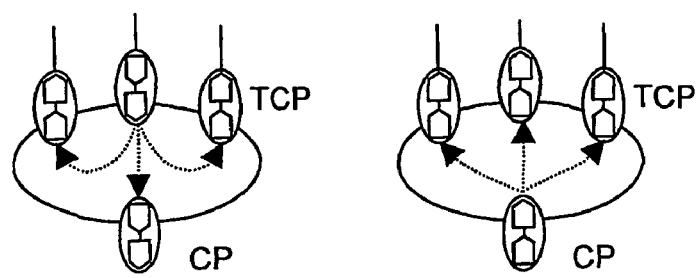
FIG. 6A shows XP layer multipoint connection points examples.

FIG. 6A Shows XP Layer Multipoint Connection Points Examples.

5.5.4.2 Point-to-multipoint Connections

A point-to-multipoint MDL Network Connection/Flow multicasts customer traffic from single node to a group of nodes. A point-to-multipoint XP Network Connection multicasts customer traffic within a single node, from an MDL/XP adaptation sink to multiple XP/Server adaptation sinks.

Figure 6B:
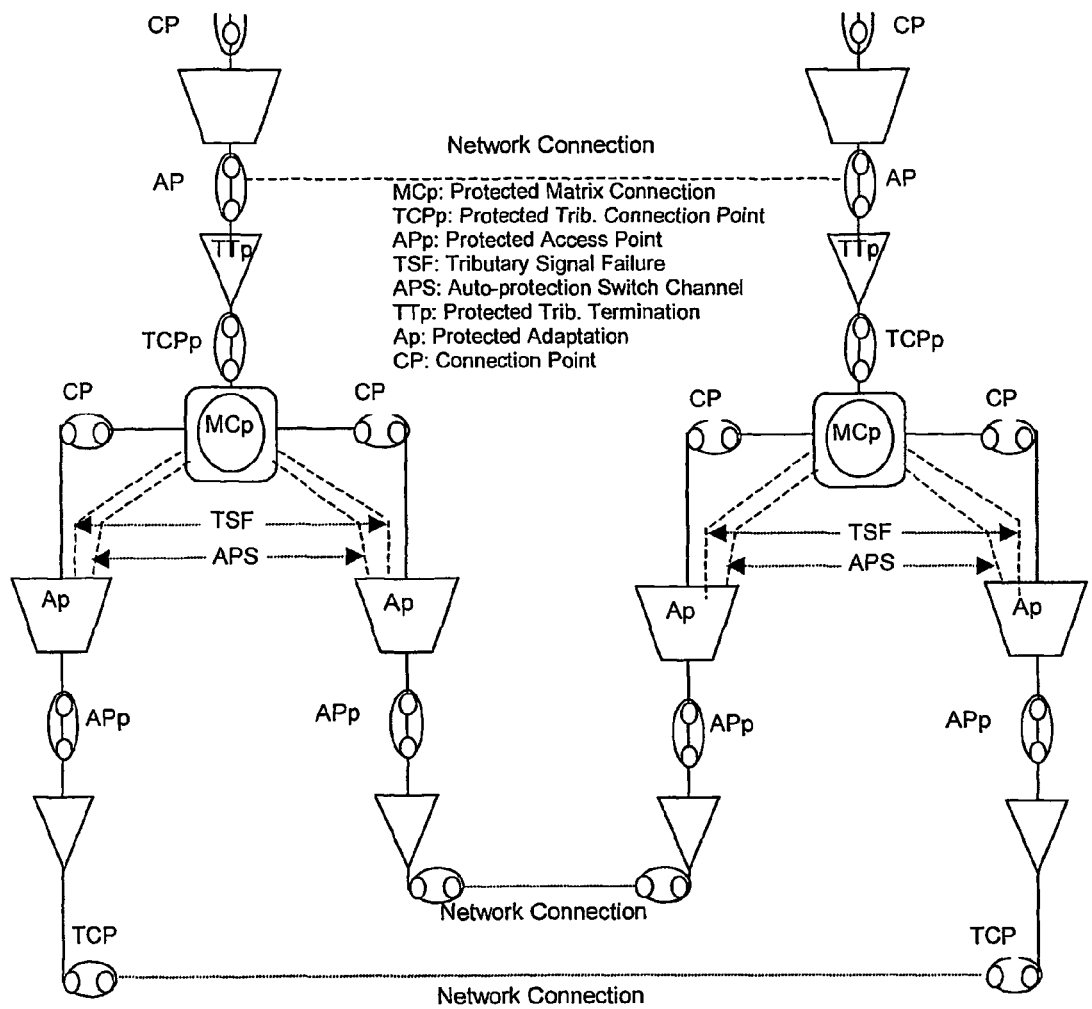
FIG. 6B shows a Flow Based 1+1 Protection.

FIG. 6B Shows a Flow Based 1+1 Protection.

5.6 Operation of Network Management Frames in MAC Client

5.6.1 Initial Configuration Table (ICT) Operation

ICT is a mapping table reflecting the initial and available value of FT and FN within a node and TCCR between nodes along a ringlet during engineering installation. The ICT must be pre-installed before MSF engineering operation. The incorrect ICT will lead to fault of Flow services on a ring. CT_Request frame with an ICT parameter reflecting initial TCCR of all nodes on a ring is sent to other nodes by broadcast/multicast mode from a node (called Node A, e.g. Central station in the most case) by network management interface during initial engineering operation period. All nodes (called Node B) received CT_Request frame will build corresponding mapping relations of TCCR in the local node and give a point-to-point response by CT_Response frame to Node A.

All nodes on a ring will wait to be assigned ICT during engineering installation period. After issuing CT_Request frame, Node A will automatically send CT_Request frame again after retransmit timer (it is programmable, named for Timer_ct) if Node A does not receive corresponding CT_Response frame. It is believed that Node B is not reachable after N_ct times of retransmission (N_ct is programmable also).

If Node A has received a message of CT_Response frame with a Null parameter from Node B either before CT retransmit expired or before N_ct times of retransmission, it is believed that ICT operation for Node B is successful.

5.6.2 Configuration Updating Table (CUT) Operation

CUT is a mapping table reflecting the available value modification of FT and FN in a node and TCCR between nodes on the MSF ring during an on-line operation. The incorrect CUT will lead to fault of Flow on MSF ring. CT_Request frame with a CUT parameter reflecting changed part of TCCR of all nodes on MSF ring is sent to other nodes (called one of them Node B) by broadcast/multicast mode from a node (called Node A, e.g. Central station in the most case) by network management interface during normal engineering operation period. All nodes received CT_Request frame will build corresponding mapping relations of TCCR in the local node and give a point-to-point response by CT_Response frame to Node A.

After issuing CT_Request frame, Node A will automatically send CT_Request frame again after retransmit timer (it is programmable, named for Timer_Ct) if Node A does not receive corresponding CT_Response frame. It is believed that Node B is not reachable after N_ct times of retransmission (N_ct is programmable also).

If Node A has received a message of CT_Response frame with a Null parameter from Node B either before retransmitted CT expired or before N_ct times of retransmission, it is believed that CUT operation for Node B is successful.

5.6.3 Configuration Table Inquiry (CTI) Operation

CT_Request frame with a Null parameter is sent to other nodes (called one of them as Node B) by unicast/multicast/broadcast mode from a node (called Node A, e.g. Central station in the most case) by network management interface during normal engineering operation period. All nodes received CT_Request frame with a Null parameter will send a point-to-point response by CT_Response frame with a CTI parameter reflecting actual configuration table of the local node on a ring to Node A.

5.7 Fault Management in MAC Client

If a fault occurs, Fault_Report frame with a fault parameter is sent to designated node (connected to network management interface). The network management entity can pass Fault_Request Frame with a fault parameter from designated node to a targeted node. The targeted node issues Fault_Response Frame with a fault parameter defined to designated node as a responding.

5.8 Performance Management in MAC Client

Once 15 minutes or 24 hours expired, each node in a ring will issue Performance_Report frame with a performance parameter defined in 7.10.1 to designated node (connected to network management interface). The network management entity can pass Performance_Request Frame with a performance parameter from designated node to a targeted node if needed anytime. The targeted node responds by Performance_Response Frame with a performance parameter to designated node.

6 The Framework 6.1 The Protocol Framework of Trunk Pipe

Figure 7:
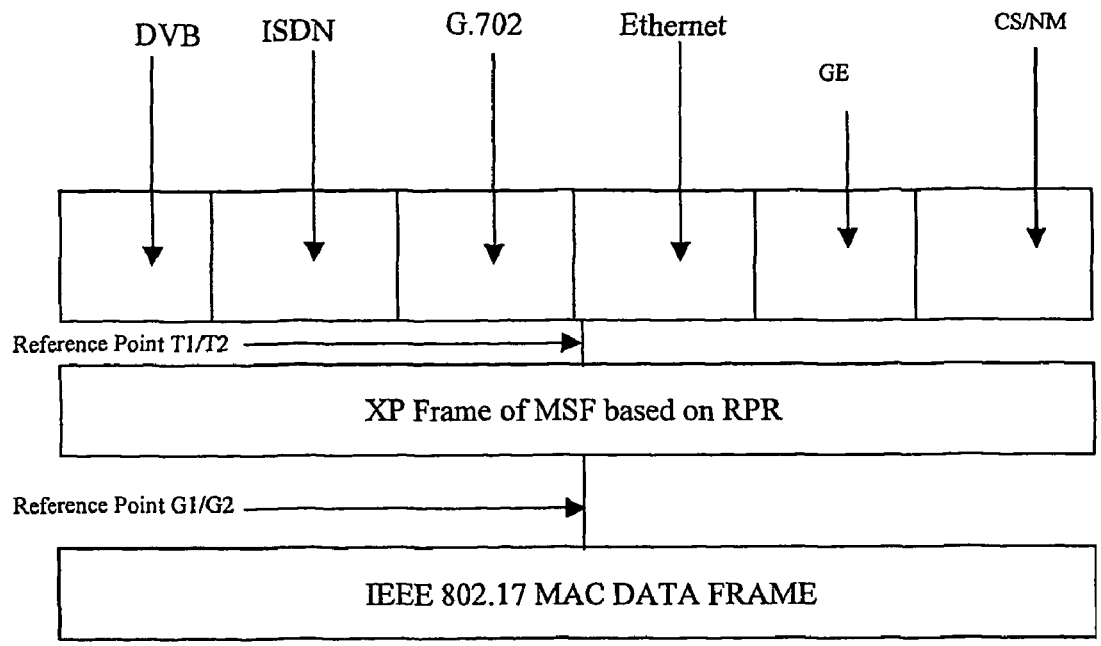
FIG. 7 shows a Generic Protocol Stack of MSF Based on RPR.

The protocol framework of XP is shown as FIG. 7. This Patent treats XP as an upper layer protocol of 802.17 MAC. The use of control signals is not required. The self-synchronous scrambling/descrambling function is not applied in XP layer during insertion/extraction into/from the MAC payload of RPR. Communication service facilities between XP and RPR MAC layer are accomplished by means of primitives (MA_DATA request and MA_DATA indication, MA_Control request and MA_Control indication shown in FIG. 8) with parameters of Ring Control Field, Destination MAC Address, Source MAC Address, Protocol Type filed, topology status, FT/CS/NM, FN value, FSN and payload or parameters of XP layer, as shown in section 7. Specification of Primitives specifies the interaction between XP and MAC layer to invoke and provide a service, and presents the elements of primitives.

XP located at RPR MAC client is the data link protocol also, which provides point-to-point transferring over RPR MAC frame. The establishment and disconnection of flow service are accomplished by the associated control signalling (Oust like Soft Permanent Virtual Circuit) or network management frames. Communications between data link and the associated upper protocols are accomplished by means of primitives according to the principle of ITU-T Patent X.212.

The service facility of X) provided to its upper protocols via SAP (Service Access Point) is the XP-UNACK-DATA request primitive with "User data" (data frame in Flow and frame of CS/NM) and "Priority" parameter set in a node, and the XP-UNACK-DATA indication primitive with "User data" (data frame in Flow and frame of CS/NM) and "Priority" parameter from received frame. "User data" is the outgoing/incoming upper layer packet. The default maximum frame size of XP shall be aligned to the size that RPR does after taking into account the overhead of XP frame. Supporting the maximum frame size of Ipv6 jumbo payload needs to align with IEEE 802.17. The octet stuffing procedure will not be used in this case.

An invalid frame is a frame which:
a) Has fewer than eight octets (includes PT, PFI, 4-bit reserved field, FT/CS/NM, FN, 4-bit reserved field, FSN fields, HEC field) within the RPR MAC payload; or
b) Contains a FT or FN that is mismatched or not supported by the receiver.

Invalid frame shall be discarded without notification to the sender. But for the lost or duplicated frames of a flow, the results of performance monitoring should be reported to layer management entity of RPR MAC client and be operated according to 7.10.1.

The connection management entity is used to monitor the XP link status of receiving the peer link frame. It is local matter only and has not any associated frame to be used between the two sides.

After initialization (the defaults of T200 and N200 are set to 10 milliseconds and 3 respectively), the XP entity enters the normal way of transmitter and receiver.

If the timer T200 expires before any frames (including MAC data and control frames) are received at the reference point G1, or status report from RPR MAC layer by MA_Control Indication or MA_Data Indication occurs with one or more opcodes, the XP entity shall restart timer T200 and decrement the retransmission counter N200.

If timer T200 expires and retransmission counter N200 has been decremented to zero before any frame is received at the reference point G1, or status report from RPR MAC layer by MA_Control Indication or MA_Data Indication occurs with one or more opcodes, the XP entity shall (a) indicate this to the local connection management entity by means of the LMXP-ERROR indication primitive, (b) indicate a notification to the local EFBP/TFBP Function Unit within the node by means of the EVENT_Report primitive with the FT and FN parameters, and (c) restart timer T200 and recover the value of N200.

The value of T200 and N200 shall be configurable. The minimum unit configured of T200 and N200 is 5 milliseconds and 1 respectively.

FIG. 7 Shows a Generic Protocol Stack of MSF Based on RPR.

Figure 8:
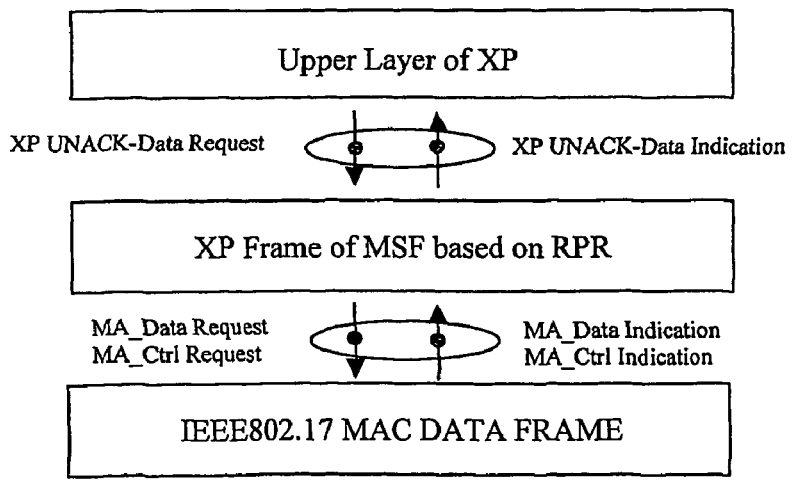
FIG. 8 shows a Relationship between XP and RPR MAC, Upper Layer and XP.

FIG. 8 Shows a Relationship between XP and RPR MAC, Upper Layer and XP.

6.2 MSR (Client) Interface to RPR MAC

Four service primitives are defined for the non-bridge client interfaces, as shown in section 5.4 (MAC services to the client layer) of IEEE802.17

MA_DATA.request
MA_DATA.indication
MA_CONTROL.request
MA_CONTROL.indication

Plus MA_UNITDATA.request and MA_UNITDATA.indication primitives.

6.2.1 MA_DATA Request

This primitive defines the transfer of data from a XP entity to a single peer entity, or to multiple peer entities in the case of group addresses. The semantics of the primitives are as follows:

MA_DATA request {
destination_address,
source_address, [optional]
mac_service_data_unit,
frame_check_sequence, [optional]
service_class,
ringlet_id, [optional]
mac_protection, [optional]
mark_fe, [optional]
strict_order, [optional]
extended_frame, [optional]
destination_address_extended, [optional]
source_address_extended, [optional]
flooding_form, [optional])

The parameters of the MA_DATA.request are described in sub-clause 5.3.1.2 of IEEE 802.17. This primitive is invoked by XP entity whenever data is to be transferred to a peer entity or entities. The receipt of this primitive shall cause the MAC entity to insert all MAC specific fields, and any fields that are unique to the particular medium access method, and pass the properly formed frame to the lower protocol layers for transfer to the peer MAC sublayer entity or entities. The MAC does not reflect frames back to the XP. If a client issues a MA_DATA.request primitive with a DA value equal to its local MAC address, the request is rejected.

6.2.2 MA_DATA Indication

This primitive defines the transfer of data from the MAC sublayer entity to XP entity. The semantics of the primitive are as follows:

MA_DATA indication {
destination_address,
source_address,
mac_service_data_unit,
frame_check_sequence,
reception_status,
service_class,
ringlet_id,
fairness_eligible,
strict_order,
extended_frame
destination_address_extended,
source_address_extended)

The parameters of the MA_DATA.request are described sub-clause 5.4 of IEEE802.17. The MA_DATA.indication is passed from the MAC sublayer entity (through the MAC Control sub-layer) to XP entity or entities to indicate the arrival of a frame to the local MAC sublayer entity that is destined for XP. Such frames are reported only if they are validly formed, and their destination address designates the local MAC entity (local station address, broadcast or multicast). A XP may elect to accept or discard frames with FCS errors. The effect of receipt of this primitive by XP is unspecified. The MAC does not reflect frames back to XP. If a MAC receives a frame with a SA value of the local MAC address, it does not cause a MA_DATA.indicate primitive to be sent to the originating client (XP). This primitive defines the transfer of control requests from the XP to the MAC Control sublayer. Its purpose is to allow the XP to control the local MAC. This primitive does not provide a direct means for a XP to transmit a control frame from the local MAC onto any ringlet; although control frames (for example echo or flush) may be indirectly generated as a result of this request.

6.2.3 MA_Control Request

This primitive defines the transfer of control requests from the XP layer to the MAC Control sublayer. Its purpose is to allow the XP to control the local MAC. This primitive does not provide a direct means for a XP to transmit a control frame from the local MAC onto any ringlet; although control frames (for example echo or flush) may be indirectly generated as a result of this request. This primitive defines the transfer of control commands from a XP entity to the local MAC Control sublayer entity. The semantics of the primitive are as follows:

MA_CONTROL request {opcode, request_operand_list}

The opcode parameter indicates the control operation requested by the XP entity. OAM_ECHO_REQ opcode with Operand (echo request parameters) (specified in sub-clause 12.3.1 of IEEE 802.17) is used to indicate "Request to transmit an echo request frame". OAM_FLUSH_REQ opcode with Operand (flush parameters) (specified in sub-clause 12.3.3 of IEEE 802.17) is used to indicate "Request to transmit an flush frame". This primitive is generated by a XP whenever it wishes to use the services of the MAC control sublayer entity. The effect of receipt of this primitive by the MAC control sublayer is opcode-specific.

6.2.4 MA_Control Indication

This primitive defines the transfer of control status indications from the MAC control sublayer to the XP. The semantics of the primitive are as follows:

MA_CONTROL indication {opcode, indication_operand_list}

The elements of the indication_operand_list parameter are specific to each opcode parameter, and defined in Table 5.3.

TABLE 5.3

Opcodes of MA_Control Indication

| Opcode name | Meaning | Operands | Specified in IEEE802.17 |
|---|---|---|---|
| OAM_ECHO_IND | Receipt of an echo reply frame | echo payload and parameters | 12.3.1 |
| OAM_FLUSH_IND | Receipt of a flush frame | flush payload and parameters | 12.3.3 |
| TOPO_CHANGE | Topology change | topology and status database | 10.2.6 |
| PROT_CHANGE | Protection change | topology and status database | 10.2.6 |
| SEND A | send A change | true/false, ringletID | 6.6.1 |
| SEND B | send B change | True/false, ringletID | 6.6.1 |
| SEND C | send C change | HopsToCongestion, ringletID | 6.6.1 |
| SC_FCM_IND | Receipt of SC-FCM | allowedRate, allowedRateCongested, hopsToCongestion, ringletID | 9.6 |
| MC_FCM_IND | Receipt of MC-FCM | fairnessMessageType, controlValue, sourceAddress, TTL, ringletID | 9.6 |

The MA_CONTROL.indication is generated by the MAC control sublayer under conditions specific to each MAC control operation. The effect of receipt of this primitive by the XP is undefined. The usage of these indications by the XP is beyond the scope of this standard; however they are made available to allow a XP to perform more complex actions beyond the capability of the MAC, for example, implementing a more efficient frame scheduling algorithm based on the knowledge of choke points reported via the SC_FCM_IND.

6.2.5 RPR MAC Interface to the Bridge Client

RPR MAC internal sub-layer service (ISS) is provided by a MAC entity to communicate with the MAC relay entity if flow services of MSF needs to bridge to another MSF. The interface for this sublayer is predefined in IEEE Std 802.1D-1998 and IEEE Std 802.1Q-1998. The MSF will use these specifications. The bridging operation of Flow traffic depends on the ability to flood frames. The unidirectional flooding via either ringlet0 or ringlet1 is applied to send the frame to all other stations in the ring.

6.2.5.1 Primitives and Parameters Involved in Internal Sub-layer Service

On receipt of a MA_UNITDATA.request primitive from XP layer, the local MAC entity performs data encapsulation to form a MAC frame using the following parameters and default setting. On receipt of a MAC frame from an trunk pipe, the frame is passed to the reconciliation sub-layer which disassembles the MAC frame into parameters, as specified below, that are supplied with the MA_UNITDATA.indication primitive to XP layer. The parameters of the primitive are as follows:

frame_type parameter takes only the value user_data_frame and shall be encoded in the FT field of the header field.

mac_action parameter takes only the value request_with_no_response and is not explicitly encoded in MAC frames.

destination_address parameter is either the address of an individual MAC entity (end station) or a group of MAC entities. Destination_address parameter is the MAC address of the intended destination entity, independent of whether the entity is local or non-local (bridged) to the ring.

source_address parameter is the individual address of the source MAC entity (end station). The source_address parameter is the MAC address of the originating entity, independent of whether the source entity is local or non-local (bridged) to the ring.

RIF parameter is the routing information field parameter specified by the 802.1Q EISS. It is passed transparently by the RPR MAC.

mac_service_data_unit parameter is the service user data and shall be encoded in the data field.

user_priority parameter provided in a data request primitive shall be encoded in the service class bits of the RPR control field of the MAC frame in accordance with user priority request and MAC service class. The user_priority parameter provided in the data indication primitive takes the value of the service class bits of the RPR control field of the MAC frame in accordance with the user priority indication and MAC service class.

access_priority parameter in an MA_UNITDATA.request primitive is mapped to the service class bits of the RPR control field of the MAC frame in accordance with the access priority request and MAC service class. The mapping of user_priority to outbound access_priority is achieved via fixed, MAC method-specific mappings. The access_priority parameter in a MA_UNITDATA.request primitive (6.4 of 802.1D) shall be determined from the user_priority.

ringletID parameter is an optional request parameter selecting the ringlet on which the frame is to be transmitted. If the ringletID parameter is omitted, the MAC shall use its default algorithm to determine which ringlet to use. The ringletID parameter is encoded in the MAC frame. The ringletID parameter is also provided in the indication primitive indicating which ringlet the frame was received. The ringletID receive parameter may be ignored by the MAC client.

MACProtection parameter is an optional request parameter requesting protection service for the transmitted frame. If the MACProtection parameter is omitted, the MAC shall provide protection for the frame.

markFE parameter is an optional request parameter requesting class B priority frames to be treated as fairness eligible. If the markFE parameter is omitted, the MAC shall apply default frame handling.

receptionStatus parameter is an optional indication parameter providing MAC frame reception status to the MAC client entity. The receptionStatus parameter may be ignored by the MAC client.

fairnessEligible parameter is an optional indication parameter indicating the setting of the fairnessEligible bit in the frame header. The fairnessEligible parameter may be ignored by the MAC client.

frame_check_sequence parameter is encoded in the FCS field of the MAC frame. The FCS is computed as a 32-bit CRC beginning with the first octet following the header checksum to the end of the frame. A bridge may choose to transmit strict or relaxed mode frames using this format. These frames may be received by either a host or a bridge giving rise to the MA-UNITDATA.indication primitive.

6.2.6 MAC Shapers Supplied to the XP

The shapers and indications to the XP operate based on a per-ringlet. The behaviours of all shapers can be characterized by a common algorithm with instance-specific parameters. All shapers' credits are adjusted down or up by decSize and incSize respectively. The decSize and incSize values typically represent sizes of a transmitted frame and of credit increments in each update interval respectively. Crossing below the loLimit threshold will generate a rate-limiting indication, so that offered traffic can stop before reaching zero credits, where excessive transmissions are rejected. The hiLimit threshold limits the positive credits, to avoid overflow. When frames are ready for transmission, credits can accumulate to no more than hiLimit.

Optional idle frames from the MAC rate synchronization are shaped by shaperI (shaper of idles). Frames from the MAC control usually shaped by shaperM (shaper of MAC). Those control frames directed to the class B or class C add paths, are shaped by the shapers for those add paths. All class A add traffic is shaped by shaperA, to avoid having the XP exceed its class A allocated rates. shaperA is logically partitioned into shaperA0, shaperA1, and shaperM. MAC control and XP traffic both flow through shaperA. All class B add traffic is shaped by shaperB and/or by shaperC, to constrain the XP within its class B rates. All class C add traffic is shaped by shaperC, to constrain the XP within its weighted fair-share use of the unused and reclaimable bandwidth.

Each MAC rate shaper can be readily identified by its credit-value name. Some of the transmission paths are affected by only one of these shapers; others are influenced by multiple shapers. The detailed operations and descriptions are referred to as sub-clause 6.7 of IEEE 802.17.

6.2.7 Choice of Strict and Relaxed Transmissions

Two types of frame transmission are supported, relaxed and strict to XP at client level. If the strict mode is applied by the RPR MAC, duplication of user data frames and reordering of frames are not permitted. The complexity of supporting strict transmission is particularly burdensome during station or link failures, or ringlet selection. So MSF uses relaxed as a default mode with a minimal amount of reorder and/or duplication. If application is required to provide strict transmission, the mode switch will be made using an opcode of strictOrder carried by the related primitives.

6.2.8 Topology Database Interface to MSF

MSF uses topology database from RPR MAC in the case of two-fibre ring application and chain. These topology messages contain information about the originating station, and the configuration and capabilities making up the current topology image of that station. These messages are generated on initial start of topology discovery periodically and on detection of a change in station or ring status. The topology image represents (1) a loop of stations or (2) a chain of stations resulting from a ring broken at one or more points. LME image of the topology is applied to do this function using the related MIB and primitive, i.e.

MLME-REQUEST.get
MLME-REQUEST.set
MLME-INDICATE.event
MLME-RESET.request
MLME-RESET.confirm A description will be added to D2.2 on how the LME is used in support of higher layer clients.

6.3 Flow Adaptation Function Unit

Flow Adaptation Function Unit is an adaptation function from/to various independent flow type signals to/from reference point T1/T2. It has Flow Adaptation Source Function and Sink Function. The Sink corresponds to reference point T1, The Source to reference point T2. This adaptation function includes the signal and rate transform, synchronous function between Flow Rx/Tx Framer and flow service interface.

7 Generic Frame Format

Figure 9:
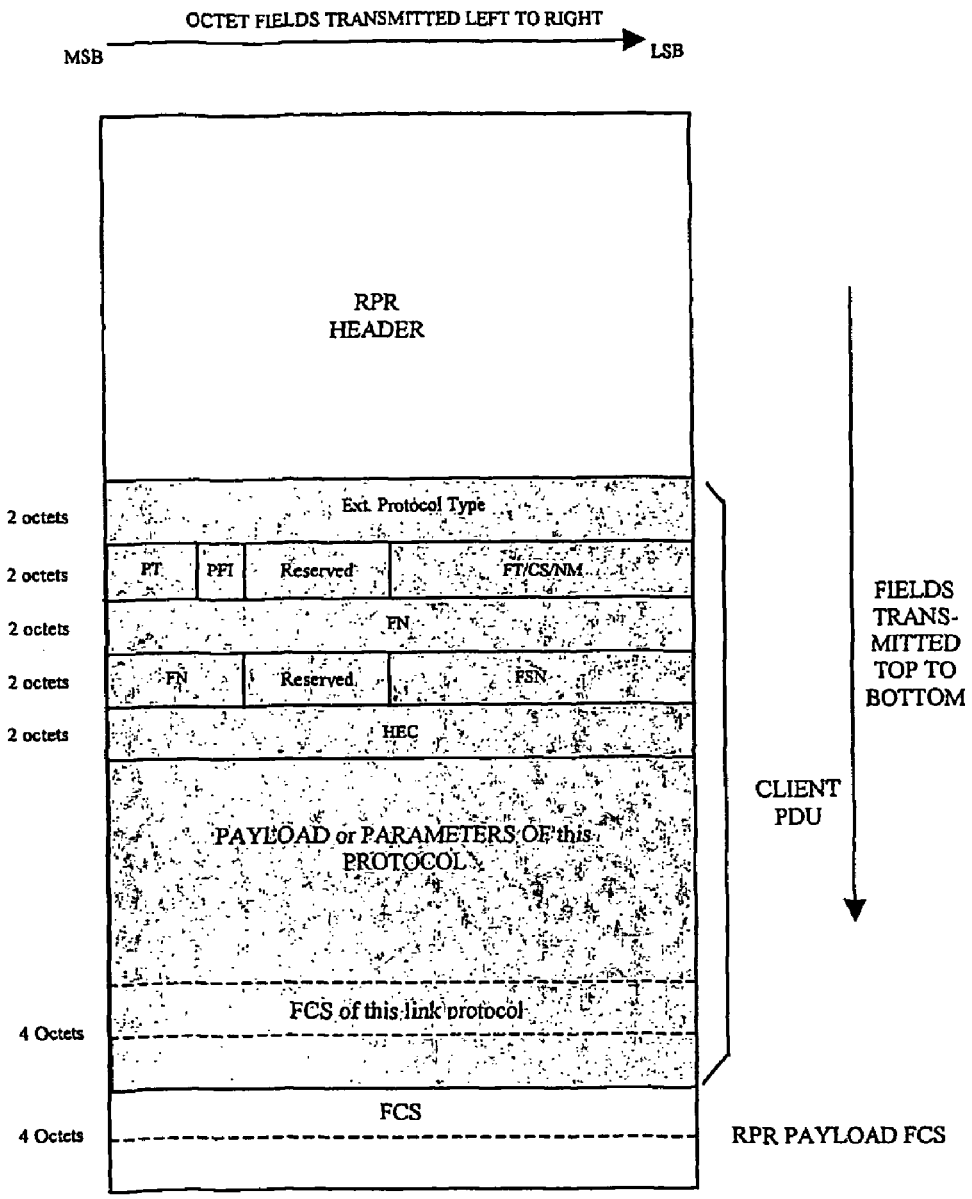
FIG. 9 shows a Generic Frame Format.

A XP frame uses a fixed sized header. The generic frame format is shown in FIG. 9. All binary fields in the following descriptions are transmitted in Most Significant Bit (MSB) to Least Significant Bit (LSB) order, from top to bottom. The definitions of Ring Control Field, Destination Address, Source Address, Protocol Type Field, Header Checksum and FCS Field have been specified in IEEE 802.17 RPR. This section will focus on the FT, PFI, 4-bit reserved field, FT/CS/NM, FN, 4-bit reserved field, FSN field. Protocol type field is 0x88bc assigned by IEEE. The above format is only one example. The arrangement of the fields could be changed by adding/deleting some fields or changing the sequence of the fields according to the present invention.

FIG. 9 Shows a Generic Frame Format.

7.1 Destination Address for Use of This Patent

MSF does support for both local address and OUI MAC addresses, so this 48-bit field is an OUI MAC address or local address. It is required that all nodes of the same topology use the unified address, either OUI MAC address or local address. The nodes with a local address (including PLAS) shall communicate each other within the scope of a said topology. The bridging and floodingForm shall not be used. If OUI MAC address is applied, IEEE assigns value of 24 bits, manufacturer assigns remaining 22—local indicates a locally administered address. It is the responsibility of the administrator to insure uniqueness.

The Individual/Group (I/G) address bit (LSB of octet 0) is provided to identify the destination address as an individual address or a group address. If the I/G address bit is "0", it indicates that the address field contains an individual address. If this bit is "1", the address field contains a group address that identifies one or more (or all) stations connected to the ringlet or other topologies. The all-stations broadcast address is a special, predefined group address of all 1's.

The Universally or Locally administered (U/L) address bit is the bit of octet 0 adjacent to the I/G address bit. This bit indicates if the address has been assigned by a local or universal administrator. Universally administered addresses have this bit set to "0". If this bit is set to "1", the entire address (i.e., 48 bits) has been locally administered.

In the case of I/G address bit is used to Individual and U/L address bit is used to Local application, and all other bits of Octet 1 and Octet 0 of 48-bit address field are set to all "0", this Patent defines a 32-bit Pure Local Address Structure (PLAS). The PLAS is an address of Node Link on the MSF ring. NA is a local address and has local meaning only along the MSF ring. It contains 4 octets (Octet 2, 3, 4, 5). Each bit (binary "0" or "1") corresponds to a node. For example, LSB of Octet 2 through MSB of Octet 5, the binary "00100000 00000000 00000000 00000000" stands for the $3^{rd}$ Node Address (station), the binary "00000100 00000000 00000000 00000000" stands for the $6^{th}$ Node Address (station) (refer to FIG. 1). You may also use binary "00000010 00000000 00000000 00000000" to stand for $7^{th}$ Node Address of new insertion and the actual number location of the $7^{th}$ Node Address may be corresponded to middle position between Node 1 and Node 2 shown in FIG. 1 since the MSF supports online node insertion. All Node Address must be leftward alignment and be pre-installed by (NVROM) before engineering operation. The maximum node number of the MSF Ring is 32 in the case of PLAS. For implementation, people can use Ethernet MAC and Ipv4/Ipv6 address to perform external network management and identify a node from the network management level.

7.2 Extended Protocol Field

This 16-bit field is an extended protocol type field of Ethertype field number #88bc from the IEEE within the new specification to handle different aspects of the application and future upgrades over RPR MAC, 0x0001: Multiple services flow based on RPR, other value: reserved.

7.3 Payload Type (PT) Field

This 3-bit field is used to indicate a type of XP frame, 0: User Data, 1: User Control, 2: Control Signalling (CS), 3: Network Management (NM), 4-7: reserved.

7.4 Payload FCS Indicator (PFI) Field

This 1-bit field is used to indicate if the payload FCS of 4 octets presents, 0: not present, 1: present.

7.5 Reserved Field

This 4-bit field is reserved for future use.

7.6 FT/CS/NM Field

This 8-bit field is used for codes of FT (Flow Type, or User Data), CS or NM. Which type is presented will be dependent on PT field indication.

7.6.1 Flow Type (FT) Field

When PT=binary "000", this 8-bit field is used to indicate a type of an independent adding/dropping flow channel to/from the MSF data nodes. Flow channel can be Ethernet or various TCEs. Its codes are as follows (see Table 3).

TABLE 3

FT Codes

| Flow types | Code |
|---|---|
| Reserved | 00000000-00001000 |
| G.702 PDH circuit - Synchronous circuit transport | 00001001 |
| G.702 PDH circuit - Asynchronous circuit 1.544 Mbit/s | 00001010 |
| G.702 PDH circuit - Asynchronous circuit 2.048 Mbit/s | 00001011 |
| G.702 PDH circuit - Asynchronous circuit 6.312 Mbit/s | 00001100 |
| G.702 PDH circuit - Asynchronous circuit 8.448 Mbit/s | 00001101 |

TABLE 3-continued

FT Codes

| Flow types | Code |
|---|---|
| G.702 PDH circuit - Asynchronous circuit 34.368 Mbit/s | 00001110 |
| G.702 PDH circuit - Asynchronous circuit 44.736 Mbit/s | 00001111 |
| G.702 PDH circuit - Synchronous circuit 1.544 Mbit/s | 00010000 |
| G.702 PDH circuit - Synchronous circuit 2.048 Mbit/s | 00010001 |
| G.702 PDH circuit - Synchronous circuit 6.312 Mbit/s | 00010010 |
| G.702 PDH circuit - Synchronous circuit 8.448 Mbit/s | 00010011 |
| G.702 PDH circuit - Synchronous circuit 34.368 Mbit/s | 00010100 |
| G.702 PDH circuit - Synchronous circuit 44.736 Mbit/s | 00010101 |
| Reserved for other PDH or DSL specification | 00010110-00010111 |
| Video signal - Distributive television services | 00011000 |
| Video signal - Conversational services of bit rates higher than primary rates | 00011001 |
| Video signal - Conversational services of p × 64 kbit/s signals | 00011010 |
| Reserved for other Video signals | 00011011-00011111 |
| Voiceband signal - 64 kbit/s A-law coded Patent G.711 signals | 00100000 |
| Voiceband signal - 64 kbit/s µ-law coded Patent G.711 signals | 00100001 |
| Reserved for other- Voiceband signals | 00100010-100111 |
| Digital channel supported by 64 kbit/s-based ISDN - Transport of 64 kbit/s channel | 00101000 |
| Digital channel supported by 64 kbit/s-based ISDN - Transport of 384, 1536 or 1920 kbit/s channel | 00101001 |
| Reserved for other TCEs | 00101010-00101000 |
| Ethernet (10/100 Mb/s, specified in IEEE802.3) | 00110100 |
| GE (specified in IEEE802.3) | 00110101 |
| Reserved | 00110110-11111111 |

Note:
The operation of user data between MAC and client will be implemented by invoking MA__Data Request and return of MA__Data Indication defined in section 5.4 of IEEE 802.17.

7.6.2 CS Field

When PT=binary "010", this 8-bit field is used to identify the types of control signalling shown in Table 4. The FN and FSN fields are not used and set to all-zeros value in this case.

TABLE 4

Type of Control Signalling

| CS Frame Types | Code |
|---|---|
| Reserved | 00000000-00000100 |
| SYNCHRONIZATION Request (Note1) | 00000101 |
| SYNCHRONIZATION Indication (Note1) | 00000110 |
| Topology Discovery Request (implemented by RPR MAC, via MA__Control Request) (Note2) | 00000111 |
| Topology Discovery Indication (implemented by RPR MAC, via MA__Control Indication) (Note2) | 00001000 |
| Reserved | 00001001-11111111 |

Note1:
It is optional timing (sync.) method for TCE flow, the method (d) is the first option in sub-clause 9.5.2.
Note2:
Operation of Control frame between MAC and client will be implemented via MA__Control Request and Indication defined in section 5.4 of IEEE 802.17.
Note3:
the other codes of Flow based protection, multicast, bandwidth policing, security and rate duplication is also shown in section 10.

7.6.3 NM Field

When PT=binary "011", this 8-bit field is used to identify the types of network management frame (OAM) shown in Table 5. The FSN and FN fields are not used and set to binary all-zeros value in this case.

TABLE 5

Type of Network Management Frame (OAM frame)

| NM Frame Types | Code |
|---|---|
| Reserved | 00000000-00000110 |
| CT__Request Frame | 00000111 |
| CT__Response Frame | 00001000 |
| Fault__Report Frame | 00001001 |
| Fault__Inquiry__Request Frame | 00001010 |
| Fault__Inquiry__Response Frame | 00001011 |
| Performance__Report Frame | 00001100 |
| Performance__Inquiry__Request frame | 00001101 |
| Performance__Inquiry__Response frame | 00001110 |
| LMXP__ERROR__Indication Request frame | 00001111 |
| TRL request frame | 00010000 |
| TRL response frame | 00010001 |
| TRL shortcut request frame | 00010010 |
| TRL shortcut response frame | 00010011 |
| NRV request frame | 00010100 |
| NRV response frame | 00010101 |
| NRV shortcut request frame | 00010110 |
| NRV shortcut response frame | 00010111 |
| Reserved | 00011000-11111111 |

7.7 Flow Number (FN) Field

This 20-bit field is a number of same type of Flow Ports within a MSF data node.

7.8 Reserved Field

This 4-bit field is reserved for future use.

7.9 Frame Sequence Number (FSN) Field

This 8-bit field is used to identify Frame Sequence Number (FSN) of Ethernet or TCE data frames or in numbered modulo N_fsn=64 (default value, N_fsn is programmable and can be configured to 256 if application needs) from 0 to 63. The field is used to performance monitoring function for packet lost or duplicated of TCE based flow. The related operation is given in section 9.3. The FSN field will be set to all-zero value if the signalling control frames or network management frames are presented.

7.9.1 Processing in the Transmit Side

The XP provides a sequence count value and a XP indication associated with each frame in the transmit side. The count value applied to FSN field and starts with 0, it is incremented sequentially to 63 and numbered modulo is 64 (default value). When the data link frames carrying Flow payloads traverse a MSF topologies, they may arrive destination station disorderly, or lost or duplicated one or more frames. Due to this reason, it is required that frames must be delivered in order.

7.9.2 Processing in the Receive Side

The Data Link entity in the receive side must detect the lost or duplicated frames modulo by modulo, and track the following status of dynamic data stream:

Frame sequence number and count;

Frame loss (if occur);

Frame duplication (if occur).

There are two ways to solve the real-time processing problem, (1) try to reorder and sort into the correct order, or (2) drop those disordering frames, when disordering case occurred. In implementation, these two methods should be all supported. If method (1) does not meet reliability transport and performance requirement still, the method (2) will be applied. Due to the limitation of native speed and acceptable delay of data link processing, this Patent does not support correction method for bit errors and frame losses. If the event of any lost or duplicated frame occurred, data link entity will report to the layer management entity by LMXP-ERROR Indication (see section 9).

7.10 HEC Field

The header CRC is a 16-bit checksums. Its generator polynomial is: $CRC-16=x^{16}+x^{12}+x^{5}+1$.

The checksum is computed over the PT, PFI, 4-bit reserved field, FT/CS/NM field, FN, another 4-bit reserved field and FSN field within the scope of XP, with the bits of the frame presented to the CRC generator in the same order as is described in IEEE 802.17. The initial value for the HEC CRC calculation is an all-zeros value. Single-bit error correction by the receiver is optional.

7.11 Payload of XP

When Flow or Ethernet Packet is applied, payload field is used to encapsulate upper layer protocol data or TDM data listed in Table 3. Payload is octet-oriented and its size is variable. The default maximum frame size shall be aligned to the size that RPR does for both IPv4-based and IPv6-based applications (the support of jumbo payload needs to align with IEEE 802.17 specification). Except for Flow, control signalling frame and network management are described below.

7.11.1 Control Signalling and Network Management Part

The XP does work by sending both data frame into a unidirectional ringlet and the associated network management/control frames into a counter-rotating ringlet. Generic format of CS/NM Frames is the same as that of FIG. 9, just payload field is replaced by the related parameters shown in FIG. 9. The difference of the parameter field indicates various control signalling and network management frames below. The first octet of parameters field is used to identify how many parameters are used in a CS or NM frame. Each parameter following 1$^{st}$ octet consists of type (or tag), length and value of the parameter. If the total octet number of parameters field is not based on 4-octet, it is optional that the octets padding (Binary 00000000) may be used.

7.11.1.1 CT_Request Frame

The code value of CT-Request Frame is binary "00000111". CT-Request Frame can be applied to point-to-point operation of Flow based and node based, and also used to node based multicast/broadcast operation. For the Flow based multicast/broadcast operation, please refer to as section 11 of this Patent. The major portion of CT is TCCR ID. A TCCR ID consists of FNi ID (This is an identifier of Flow p within node x), 2-bit U/M/B field (6-bit is reserved and set to binary 000000), 8-bit length field (This filed is used to indicate the total number of Flow FNj ID following length field) and one or more FNj ID (This is an identifier of Flow q within node y). ID is a value of identifier, FNi, FNj, FNk and FNm are the ith Flow Number of same FT of Node n, the jth Flow Number of same FT of Node o, the kth Flow Number of same FT of Node p and the mth Flow Number of same FT of Node q. The values of n, o, p, q are 0 through 31, and stands for numbering of node. The values of i, j, k, l are 0 through $2^{20}-1$, and stands for flow number with the same FT value. In the case of node based broadcast mode, the expressive scheme is very simple and just one FNi ID is used only. It will be sent to reach all stations.

FIG. 10 Shows Expressions of FN ID and TCCR ID.

Note: FNi ID=NAx(x=1,2,3 . . . 256)+FT+FNp (p=0,1,2, 3, . . . $2^{20}-1$), to identify the path Flow with the fixed FT and FN value within ith node. For the case of Multicast/Broadcast Mode, a flow based outgoing packet within a source node can be multicast or broadcast to a designated or source flow (ST) of other sink nodes along a MSF ring or other topologies. Each sink node should have only a source flow to receive this packet from ringlet at a time. If a membership group of multicast or broadcast has been established within a sink node, the said ST will duplicate this packet to other flows with the same membership relation.

What the ICT, CUT and Null parameters indicate is three different operations: ICT, CUT and CTI. Its type and field are described below in Table 6.

TABLE 6

Parameter Type of CT_Request Frame

| Parameter type | Parameter Field |
|---|---|
| ICT | Binary "00000001 00100000" + "octet number of parameter" + "value of TCCR ID shown in FIG. 10" |
| CUT | Binary "00000001 00100001" + "octet number of parameter" + "value of TCCR ID shown in FIG. 10" |
| Null | Binary "00000001 00100011 00000001 00000000" |

Note:
the interface interaction between MAC and client are operated via MA_Data Request and Indication primitives.

7.11.1.2 CT_Response Frame

Null parameter in CT_Response Frame is used by ICT and CUT operations. CTI parameter is followed by CTI operation.

TABLE 7

Parameter Type of CT_Request Frame

| Parameter type | Parameter Field |
|---|---|
| CTI | Binary "00000001 00100100" + "octet number of parameter" + "value of TCCR ID shown in FIG. 10" |
| Null | Binary "00000001 00100011 00000001 00000000" |

Note:
the interface interaction between MAC and client are operated via MA_Data Request and Indication primitives.

The corresponding operation is got in section 5.6 and parameter is shown in Table 7.

7.10.1.3 Fault_Report Frame

TABLE 8

Parameter Type of Fault_Report Frame

| Parameter type | Parameter Field |
|---|---|
| PSF | Binary "00000001 00000011 00000001 00000000" |
| PSD | Binary "00000001 00000010 00000001 00000000" |

Note:
the interface interaction between MAC and client are operated via MA_Data Request and Indication primitives.

The corresponding operation is got in section 5.7 and parameter is shown in Table 8.

7.11.1.4 Parameter of Fault_Inquiry_Request Frame

TABLE 9

Parameter Type of Fault_Inquiry_Request Frame

| Parameter type | Parameter Field |
|---|---|
| Null | Binary "00000001 00100011 00000001 00000000" |

Note:
the interface interaction between MAC and client are operated via MA_Data Request and Indication primitives.

The corresponding operation is got in section 5.7 and parameter is shown in Table 9.

7.11.1.5 Parameter of Fault_Inquiry_Response Frame

TABLE 10

Parameter Type of Fault_Inquiry_Request Frame

| Parameter type | Parameter Field |
|---|---|
| PSF | Binary "00000001 00000011 00000001 00000000" |
| PSD | Binary "00000001 00000010 00000001 00000000" |

Note:
the interface interaction between MAC and client are operated via MA_Data Request and Indication primitives.

The corresponding operation is got in section 5.7 and parameter is shown in Table 10.

7.11.1.6 Parameter of Performance_Report Frame

TABLE 11

Parameter Type of Performance_Report Frame

| Parameter type | Parameter Field |
|---|---|
| A set of FNi in a node (designated) | Binary "00000001 01000000" + "octet number of parameter" + "value of FNi shown in FIG. 10" |
| FNFCS_15m (Total Number of FCS error in 15 minutes, 4octets, 4octets length) | Binary "00000001 01000001" + "00000100" + "value of FNFCS-15m shown in FIG. 10" |
| FNPL_15m (Total Number of Frame Loss in 15 minutes, 4octets length) | Binary "00000001 01000001" + "00000100" + "value of FNPL-15m shown in FIG. 10" |
| FNFCS_24h (Total Number of FCS error in 24 hours, 5octets length) | Binary "00000001 01000001" + "00000101" + "value of "FNFCS-24h shown in FIG. 10" |
| FNPL_24h (Total Number of Frame Loss in 24 hours, 5octets length) | Binary "00000001 01000001" + "00000101" + "value of "FNPL-24h shown in FIG. 10" |

Note 1:
FNFCS and FNPL represents two different registers reflected values of "Total Number of FCS error" and "Total Number of Frame Loss" respectively.
Note 2:
the interface interaction between MAC and client are operated via MA_Data Request and Indication primitives.

The corresponding operation is got in section 5.8 and parameter is shown in Table 11.

7.11.1.7 Parameter of Performance_Inquiry_Request Frame

TABLE 12

Parameter Type of Performance_Inquiry_Request Frame

| Parameter type | Parameter Field |
|---|---|
| A set of FNi in a node (designated) | Binary "00000001 01000000" + "octet number of parameter" + "value of FNi shown in FIG. 10" |

Note 1:
the interface interaction between MAC and client are operated via MA_Data Request and Indication primitives.

The corresponding operation is got in section 5.8 and parameter is shown in Table 12.

7.11.1.8 Parameter of Performance_Inquiry_Response Frame

TABLE 13

Parameter Type of Performance_Inquiry_Response Frame

| Parameter type | Parameter Field |
|---|---|
| A set of FNi in a node (designated) | Binary "00000001 01000000" + "octet number of parameter" + "value of FNi shown in FIG. 10" |
| FNFCS_15m (Total Number of Frame Loss in 15 minutes, 4octets length) | Binary "00000001 01000001" + "00000100" + "value of FNFCS-15m shown in FIG. 10" |
| FNPL_15m (Total Number of Frame Loss in 15 minutes, 4octets length) | Binary "00000001 01000001" + "00000100" + "value of FNPL-15m shown in FIG. 10" |
| FNFCS_24h (Total Number of Frame Loss in 24 hours, 5octets length) | Binary "00000001 01000001" + "00000101" + "value of FNFCS-24h shown in FIG. 10" |
| FNPL_24h (Total Number of Frame Loss in 24 hours, 5octets length) | Binary "00000001 01000001" + "00000101" + "value of FNPL-24h shown in FIG. 10" |

Note 1:
FNFCS and FNPL represents two different registers reflected values of "Total Number of FCS error" and "Total Number of Frame Loss" respectively.
Note 2:
the interface interaction between MAC and client are operated via MA_Data Request and Indication primitives.

The corresponding operation is got in section 5.8 and the parameters are shown in Table 13.

7.12 XP Payload FCS

The Frame Check Sequence (FCS) is a 32-bit cyclic redundancy check (CRC) as used in IEEE 802.3 CSMA/CD. The generator polynomial is:

$$CRC\text{-}32 = x^{32}+x^{26}+x^{23}+x^{22}+x^{16}+x^{12}+x^{11}+x^{10}+x^8+x^7+x^5+x^4+x^2+x^1+1$$

The FCS CRC is calculated starting from the octets following the HEC field to the end of frame, with the bits of the frame presented to the CRC generator in the same order as is described IEEE 802.17. The initial value for the FCS CRC calculation is an all-ones value. If Ethernet is contained in the payload, or CS/NM parameters are contained in the payload, PFI is set to zero and XP payload FCS will not be used.

8 Flow Loopback (TRL) and Node Reachability Verification (NRV)

8.1 Flow Loopback (TRL)

Once TRL function is set, a node provides local or remote data channel shortcut from Tx interface to Rx interface in Flow. This Patent allows the XP entity to get a TRL request (OAM) operation from OAM to a specific destination in order to check the Flow connectivity of a MSF station. At the interface from OAM to MAC, parallel operation should be made by the corresponding MIB in RPR MAC to invoke an OAM frame specified in subclause 12.3.1 of IEEE 802.17. TRL_request used by XP OAM when transferred to both RPR MAC and XP entity from OAM will produce a TRL operation. The MSF TRL request (OAM operation) capability allows for a frame to be inserted in a Flow at one station in the ring, and a Loopback response (XP operation) returned by a peer Flow of another station through the same or opposite ringlet, with minimal impact on the data flow between stations. Those frames activated by TRL request/response operation can be assigned any service class. Those frames activated by the TRL request may contain any number of user specific octets up to the maximum permitted frame size, and the userData is copied into the reply frame. The TRL request/response operation can be sent through the default ringlet, ringlet0 or ringlet1 for the dual-fibre ring case.

The operation of a TRL request source station from a XP OAM shall contain:

1) The invocation of network management (OAM) frame of MSF
2) The related fields of network management frame includes:
   a) The DA to the target MAC address
   b) The SA to its own MAC address
   c) The values of target FT and FN, service class of payload
   d) The route of request operation, i.e. ringlet selection
   e) The desired protectionMode
   f) The payload of a MSF request frame includes (in order): source FN (20-bit), 12-bit reserved field (set to all "0") and desired userData (an integer of octet).

On receipt of a TRL network management frame from an trunk pipe, the response frame is passed to the reconciliation sublayer which disassembles the MAC frame into parameters. The response operation of a sink station in the XP entity shall contain:

a) Exchange DA and SA of incoming frame to form outgoing response frame
b) Exchange the FN values between source and target
c) The route of request operation, i.e. ringlet selection
d) The desired protectionMode and userData (payload of a MSF frame)
e) The payload of a MSF response frame includes (in order): the changed FN (20-bit) value, 12-bit reserved field (set to all "0") and copy all received userData from the request frame.

The corresponding type code of network management frame operation is listed in Table 5.

8.2 Flow Loopback (TRL) Shortcut

Once TRL shortcut function is set, a node provides round-trip shortcut along the ringlet from a local station to itself and also including from the local Tx to the local Rx of Flow. This Patent allows the XP OAM to request a TRL shortcut operation to a specific destination in order to check the fibre connectivity of a ringlet. At the interface from OAM to MAC, parallel operation should be made by the corresponding MIB in RPR MAC to invoke a flush operation specified in subclause 1.17 of IEEE 802.17. A flush has the effect of clearing the selected ringlet of previously sourced Flow traffic. A flush function is expected to be used when changing the ringlet selection algorithm, when revised ringlet selection protocols are necessary to access all stations (for steer-protection) or to improve bandwidth utilization (for wrap protection). The RPR flush capability may also be used for Flow controlled misorder prevention when changing the preferred ring direction of a given flow or for Flow determination of RTT. This is very useful to allocated bandwidth and account management of Flow based.

The corresponding type code of network management frame operation is listed in Table 5.

8.3 Node Reachability Verification (NRV)

To check Node reachability along a ringlet, this Patent allows the XP OAM to request a NRV operation to a specific destination in order to check the node reachability. At the interface from OAM to MAC, parallel operation should be made by the corresponding MIB in RPR MAC to invoke an OAM frame specified in subclause 12.3.1 of IEEE 802.17. The NRV request capability allows for a frame to be inserted at one station, and a NRV response (XP operation) returned by another station through the same or opposite ringlet, with minimal impact on the data flow between stations. NRV request/response frames can be assigned any service class. The NRV request frame may contain any number of user specific octets up to the maximum permitted frame size, and the userData is copied into the reply frame. The NRV request/response operation can be sent through the default ringlet, ringlet0 or ringlet1 for the dual-fibre ring case.

The operation of a NRV request source station from a XP OAM shall contain:

1) The invocation of network management (OAM) frame of MSF
2) The related fields of network management frame includes:
   a) The DA of target MAC address
   b) The SA to its own MAC address
   c) The values of target FT and FN and service class of payload are don't care
   d) The route of request operation, i.e. ringlet selection
   e) The desired protectionMode
   f) The payload of a NRV request frame is don't care On receipt of an NRV network management (request) frame from a trunk pipe, the response frame is passed to the reconciliation sublayer which disassembles the MAC frame into parameters. The response operation of a sink station in the XP entity shall contain:

a) Exchange DA and SA of incoming frame to form outgoing response frame
b) Selection of the desired response route, i.e. ringlet selection
c) The desired protectionMode and userData (don't care)

The corresponding type code of network management frame operation is listed in Table 5.

8.4 Node Reachability Verification (NRV) Shortcut

To check Node reachability along a ringlet, this Patent allows the XP OAM to request a NRV shortcut (request) operation to a specific destination in order to check the node reachability from a local station to itself. At the interface from OAM to MAC, parallel operation should be made by the corresponding MIB in RPR MAC to invoke flush operation specified in subclause 1.17 of IEEE 802.17.

The corresponding type code of network management frame operation is listed in Table 5.

9 TDM Circuit Emulation (TCE) Over MSF 9.1 Introduction

This section provides a protocol model along MSF for TDM based bit-stream or octet-steam over MSF. Each station can have one or more TCEs as Flow. TCE is operated end-to-end and is originated from the source station and terminated at the sink station. TCE can be operated in the way of half-duplex point-to-point, full-duplex point-to-point or half-duplex point-to-multipoint.

9.2 Protocol Framework of TDM Circuit Emulation (TCE)

The protocol framework of TCE is involved in the underlying RPR MAC trunk pipe shown in FIG. 11. The functions of encapsulation, real-time transport of order, detection of disorder and duplication, sorting, error report, primitives and related parameters, and timing synchronous processing etc are performed within the XP.

FIG. 11 Shows a TDM Service Channel Over MSF.

9.3 Services Provided by MSF Data Link 9.3.1 Definitions

The layer services provided by MSF Data link to TCE layer are:

Transfer of service data units with a constant source bit rate from TCE layer and the delivery of them with the same bit rate in MSF data link layer; and/or Transfer of timing information between source and destination; and/or Transfer of structure information between source and destination; and/or Indication of lost, duplicated or errored information that is not recovered by RPR data link if needed.

9.3.2 Primitives Between XP and the XP User 9.3.2.1 General

At the Service Access Point (SAP) of XP layer, the following primitives is used between the XP and the TCE layer:

From a TCE layer to the XP,
XP-UNACK-DATA Request;
From the XP to the TCE layer,
XP-UNACK-DATA Indication.
From the XP to the management entity;
LMXP-ERROR Indication.

A XP-UNACK-DATA request primitive at the local XP-SAP will result in a XP-UNACK-DATA indication primitive at its peer XP-SAP.

9.3.2.2 Definition of XP Primitives 9.3.2.2.1 XP-UNACK-DATA Request (Be Not Used to Signalling Frames)

XP-UNACK-DATA request (USERDATA [Necessary], STRUCTURE [optional])

The XP-UNACK-DATA request primitive requests the transfer of the XP-SDU, i.e. contents of the USERDATA parameter, from the local XP entity to its peer entity. The length of the XP-SDU and the time interval between two consecutive primitives is constant. These two constants are a function of the XP service provided to the TCE layer.

9.3.2.2.2 XP-UNACK-DATA Indication (Be Not Used to Signalling Frames)

| XP-UNACK-DATA indication | (USERDATA [Necessary], STRUCTURE [optional], ERROR [optional]) |
|---|---|

A XP user is notified by the XP that the XP-SDU, i.e. contents of the USERDATA parameter, from its peer is available. The length of the XP-SDU and the time interval between two consecutive primitives should be constant. These two constants are a function of the XP service provided to the TCE layer.

9.3.2.2.3 LMXP-ERROR Indication

| LMXP-ERROR indication | (T_error [Necessary], REG_lost [optional], REG_duplicated [optional]) |
|---|---|

REG_lost and REG_duplicated parameters are used to identify how many sequence frames are lost and duplicated by FSN detection from the transmit side to receive side in the specific period (T_error). Once sequence lost or duplicated is occurred, LMXP-ERROR indication will be applied.

9.3.2.4 Definition of Primitive Parameters 9.3.2.4.1 USERDATA Parameter

The USERDATA parameter carries the XP-SDU to be sent or delivered. The size of each block to be delivered depends on the specific XP layer service used. For the same type of TCE payload, i.e. ITU-T G.702 PDH circuit, the payload length of XP-PDU is constant and default is set to 512 octets. For the supported TCE payloads, the payload length of XP-PDUs is defined as following.

TABLE 14

Selection of Default Payload Length of XP-PDU

| Types of TCE payload | Default Payload Length of XP-PDU (octets) |
|---|---|
| G.702 PDH circuit - Synchronous circuit transport | 512 |
| G.702 PDH circuit - Asynchronous circuit transport | 512 |
| Video signal - Distributive television services | 188 |
| Video signal - Conversational services of bit rates higher than primary rates | 188 |
| Video signal - Conversational services of p × 64 kbit/s signals | 188 |
| Voiceband signal - 64 kbit/s A-law or μ-law coded Patent G.711 signals | 512 |
| Digital channel supported by 64 kbit/s-based ISDN - Transport of 64 kbit/s channel | 512 |
| Digital channel supported by 64 kbit/s-based ISDN - Transport of 384, 1536 or 1920 kbit/s channel | 512 |

9.3.2.4.2 STRUCTURED Parameter (Option of XP-UNACK-DATA Primitive)

The STRUCTURED parameter can be used when the data stream of TCE layer to be transferred to the peer XP entity is organized into groups of bits. The length of the structured block is fixed for each instance of the XP service. The length is an integer multiple of 32 bits. An example of the use of this parameter is to support circuit mode bearer services of the 64 kbit/s-based ISDN. The two values of the STRUCTURED parameter are:

BOUND and
DATA-STREAM.

The value BOUND is used when the USERDATA is the first part of a structured block which can be composed of consecutive USERDATA. In other cases, the structure parameter is set to DATA-STREAM. The use of the STRUCTURED parameter depends on the type of XP service provided. The use of this parameter is agreed prior to or at the connection establishment by network management between the TCE layer and the Data Link layer. In most application, the function of "STRUCTURE parameter" has been covered by the transform and adaptation function of Flow at the Flow interface within a node since XP uses pre-plan and connection oriented policy, and TCCR is made (e.g. ISDN 64 kb/s Flow source in a node to ISDN 64 kb/s Flow sink, E1 (2048 kbit/s) Flow source in a node to E1 (2048 kbit/s) Flow sink) by network management entity or control signalling before Flow service is operated on-line.

9.3.2.4.3 ERROR Parameter (Option of XP-UNACK-DATA Primitive)

The ERROR parameter is involved to identify that the USERDATA is errored or non-errored. The ERROR parameter has two values:

NO and
YES.

The "YES" value does imply that the USERDATA covers a dummy value within this frame. The "NO" value implies that the no error is found from transmit to receive side. The use of the ERROR parameter and the choice of dummy value depend on the type of XP service provided. The use of this parameter is agreed prior to or at the connection establishment of TCCR between the TCE layer and the XP layer.

9.3.2.4.4 T_error, REG_lost and REG_duplicated Parameters

The connection management entity is used to monitor the error status of receiving the peer link frame at peer-to-peer level. It is local matter only and has not any associated frame to be used between the two sides.

REG_lost and REG_duplicated parameters are attached to LMXP-ERROR Indication primitive to identify how many sequence frames are lost and/or duplicated from the transmit side to receive side in the specific period (T_error). Their accumulation values are stored and transformed to the two specific registers in the receive side. The parameter T_error in the unit of second is an initial value (15 minutes and 24 hours are two default values) and configurable by the network management entity according to the rate of specific service over XP. Each Flow has the corresponding REG_lost and REG_duplicated, and is separated operated from other Flow. At the beginning of RPR Data Node start-up, the REG_lost and REG_duplicated of each Flow are clear and set to zero.

If the timer T_error expires before no lost or duplicated frames are received, the link entity shall restart timer T_error. The XP entity shall not indicate this to the local connection management entity.

Once the timer T_error expires if any lost or duplicated frame is received, the XP entity shall indicate this to the local connection management entity by means of the LMXP-ERROR indication primitive, and restart timer T_error.

9.4 Supported Functions of XP for TCE Case

The following functions can be performed in the XP in order to meet requirements of TDM (Time Division Multiplex) timing, structure, jitter and wander:

a) source clock frequency recovery at the receiver;
b) recovery of the source data structure at the receiver;
c) blocking and deblocking of XP user information;
d) control of frame latency variation;
e) processing of lost or duplicated frames;

NOTE—For some XP users, the end-to-end QOS monitoring may be needed to provide. This function can be achieved by calculating a CRC, reporting lost or duplicated frames in the default period (e.g. 15 minutes and 24 hours) for the XP-PDU, A corresponding periodic count of CRC computation, values of REG_lost and REQ_duplicated are sent to network management entity.

9.4.1 TCE Processing Mode
9.4.1.1 Processing Mode of G.702 PDH

For this sub-section, it is necessary to identify TCE data structure and the clock operation mode at the XP service boundary, i.e. framing or non-framing, types of clock (synchronous or asynchronous) where needed to make comparison to a network clock. Asynchronous and synchronous TCE transport provides transport of signals from TCE sources whose clocks are non-frequency-locked and frequency-locked to a network clock respectively. The judgement of synchronous or asynchronous will depend on the service provided by the specific network, i.e. PDH, SDH, or ISDN. Care should be taken to select the shortest transport path, control priority of delivery and transient, and reduce transport latency and latency variation along RPR during the project installation phase.

1) Asynchronous G.702 circuit

| | |
|---|---|
| Circuit rate at XP service boundary: | 1.544, 2.048, 6.312, 8.448, 44.736 and 34.368 Mbit/s as specified in Patent G.702. |
| Payload size to be encapsulated: | see Table 14 |
| Source clock frequency recovery: | Asynchronous frequency |
| Error status indication at the receiver: | count report of lost or duplicated frames by LMXP-ERROR Indication primitive. |

2) Synchronous G.702 circuit

| | |
|---|---|
| Circuit rate at XP service boundary: | 1.544, 2.048, 6.312, 8.448, 44.736 and 34.368 Mbit/s as specified in Patent G.702. |
| Payload size to be encapsulated: | see Table 14 |
| Source clock frequency recovery: | Synchronous timing |
| Error status indication at the receiver: | count report of lost or duplicated frames by LMXP-ERROR Indication primitive. |

9.4.1.2 Processing Mode of Video Signal Transport

This sub-section presents the processing mode of Video signal transport. Care should be taken to select the shortest transport path, control priority of delivery and transient, and reduce transport latency and latency variation along RPR during the project installation phase.

1) Mode of Conversational services of p×64 kbit/s signals

This sub-section gives the processing mode of interactive video signals of the p×64 videotelephony and videoconference applications as specified in Patent H.320.

| | |
|---|---|
| a) Circuit rate at XP service boundary: | 384, 1536 or 1920 kbit/s in the 64 kbit/s-based ISDN by using H0, H11, H12, respectively. |
| b) Payload size to be encapsulated: | see Table 14 |
| c) Source clock frequency recovery: | Synchronous timing |
| d) Error status indication at the receiver: | count report of lost or duplicated frames by LMXP-ERROR Indication primitive. |

2) Mode of Distributive television services

This sub-section illustrates transport of distributive television signals encoded by using MPEG2 with a constant bit rate specified in Patent J.82.

| | |
|---|---|
| a) Circuit rate at XP service boundary: | Depending on MPEG2 parameters |
| b) Payload size to be encapsulated: | see Table 14 |
| c) Source clock frequency recovery: | Asynchronous frequency |
| d) Error status indication at the receiver: | count report of lost or duplicated frames by LMXP-ERROR Indication primitive. |

3) Mode of Conversational services of bit rates higher than primary rates

This sub-section illustrates transport of interactive video signals for, i.e. video-telephony and conference application specified in Recommendation H.310.

| | |
|---|---|
| a) Circuit rate at XP service boundary: | Depending on H.310 parameters |
| b) Payload size to be encapsulated: | see Table 14 |
| c) Source clock frequency recovery: | Synchronous/Asynchronous per Patent H.310 |
| d) Error status indication at the receiver: | count report of lost or duplicated frames by LMXP-ERROR Indication primitive. Patent H.310 should be taken into account. |

9.4.1.3 Processing Mode of Digital Channel Supported by 64 kbit/s-based ISDN This sub-section presents the processing mode of digital channel supported by 64 kbit/s-based ISDN. Care should be taken to select the shortest transport path, control priority of delivery and transient, and reduce transport latency and latency variation along RPR during the project installation phase.

1) Mode of 64 kbit/s channel
   | | |
   |---|---|
   | a) Circuit rate at XP service boundary: | 64 kbit/s |
   | b) Payload size to be encapsulated: | see Table 14 |
   | c) Source clock frequency recovery: | Synchronous timing |
   | d) Error status indication at the receiver: | count report of lost or duplicated frames by LMXP-ERROR Indication primitive. |

2) Mode of 384, 1536 or 1920 kbit/s channel
   | | |
   |---|---|
   | a) Circuit rate at XP service boundary: | 384, 1536 or 1920 kbit/s |
   | b) Payload size to be encapsulated: | see Table 14 |
   | c) Source clock frequency recovery: | Synchronous timing |
   | d) Error status indication at the receiver: | count report of lost or duplicated frames by LMXP-ERROR Indication primitive. |

9.4.1.4 Processing Mode of Voice-band Signal

This sub-section presents the processing mode of 64 kbit/s A-law or µ-law coded Patent G.711 signals. Care should be taken to select the shortest transport path, control priority of delivery and transient, and reduce transport latency and latency variation along RPR during the project installation phase.

| | |
|---|---|
| a) Circuit rate at XP service boundary: | 64 kbit/s |
| b) Payload size to be encapsulated: | see Table 14 |
| c) Source clock frequency recovery: | Synchronous timing |
| d) Error status indication at the receiver: | count report of lost or duplicated frames by LMXP-ERROR Indication primitive. |

9.4.2 TCE Function of MSF Data Link

9.4.2.1 TCE Functions for Circuit

The following sections provide both asynchronous and synchronous TCE transport function along RPR or other topologies. Asynchronous and synchronous TCE supports transport of signals from constant bit rate sources whose clocks are non-frequency-locked and frequency-locked respectively to a network clock. Asynchronous examples are Patent G.702 signals at 1.544, 2.048, 6.312, 8.448, 32.064, 44.736 and 34.368 Mbit/s, Synchronous examples are at 64, 384, 1536 and 1920 kbit/s as specified in Patent I.231.

1) Consideration of XP user information

The length of the XP-SDU is 64 octets. A XP-SDU constitutes one XP PDU payload. For those XP users, it requires a peer-to-peer presetting of structured data, i.e. 8 kHz structured data for circuit mode bearer services of the 64 kbit/s-based ISDN.

2) Processing strategy of frame delay variation

A buffer mechanism is used to support this function. In the event of buffer underflow, it can be necessary for the XP to maintain bit count integrity by inserting the appropriate number of dummy bits. In the event of buffer overflow, it may be necessary for the XP to maintain bit count integrity by dropping the appropriate number of bits.

When Patent G.702 1.544-Mbit/s and 2.048-Mbit/s signals are being transported, the inserted dummy bits shall be all "1"s.

3) Processing strategy of lost and duplicated frames

A destination XP can determine whether the frames have been lost by tracking the Frame Sequence Number (FSN) or sequence count values of the received XP PDUs. Detected duplicated frames are discarded.

In order to maintain the bit count integrity of the XP user information, it may be necessary to compensate for lost frames detected by buffer underflow and sequence count processing by inserting the appropriate number of dummy payloads. The content of this dummy payload depends on the XP service being provided. For example, this dummy payload is all "1"s for Patent G.702 1.544 Mbit/s and 2.048-Mbit/s signals.

4) Guaranty of jitter and wander

This function is required for delivery of XP-SDUs to a XP user at a constant bit rate. Recovered source clock should meet the requirement of jitter and wander performance of the related Patent defined. For example, the jitter and wander performance for Patent G.702 signals is specified in Patents G.823 and G.824, for which the XP procedure to be used.

9.4.2.2 TCE Functions of Video Signal

The following sections present processing of video signals for interactive and distributive services:

1) Consideration of XP user information

The length of the XP-SDU is 188 octets. A XP-SDU constitutes one XP PDU payload. For those XP users, it requires a peer-to-peer presetting of structured data. Depending on the type of XP service provided (i.e. the interface to the XP user), the ERROR parameter will be passed to the XP user to facilitate further picture processing.

2) Processing strategy of frame delay variation

A buffer mechanism is used to support this function. The size of this buffer is dependent upon specifications video signal. In the event of buffer underflow, it may be necessary for the XP to maintain bit count integrity by inserting the appropriate number of dummy bits. In the event of buffer overflow, it may be necessary for the XP to maintain bit count integrity by dropping the appropriate number of bits.

3) Processing of lost and duplicated frames

A destination XP can determine whether the frame has been lost by tracking the Frame Sequence Number (FSN) or sequence count values of the received XP PDUs. Detected duplicated frames are discarded.

In order to maintain the bit count integrity of the XP user information, it may be necessary to compensate for lost frames detected by buffer underflow and sequence count processing by inserting the appropriate number of dummy payloads. The content of this dummy payload depends on the XP service being provided.

Information in lost frames may be recovered by the mechanism described in 9.5.1.

4) Guaranty of jitter and wander

This function is required for delivery of XP-SDUs to a XP user at a constant bit rate. Some XP users may require source clock frequency recovery, i.e. recovery in the receive side of camera clock frequency that is not locked to the network clock.

9.4.2.3 TCE Functions of Voice-band Signal

The following sections support processing of a single voice-band signal, i.e. one 64 kbit/s A-law or μ-law coded Patent G.711 signal.

1) Consideration of XP user information

The length of the XP-SDU is 64 octets. A XP-SDU constitutes one XP PDU payload.

2) Processing of frame delay variation

A buffer mechanism is used to support this function. The size of this buffer depends on specifications provided in voice-band signal.

3) Processing strategy of lost and duplicated frames

For voice-band signals, there is a need still to detect duplicated and lost frames.

The receiving XP entity must detect/compensate for lost frame events to maintain bit count integrity and must also minimize the delay, i.e. to alleviate echo performance problems, in conveying the individual voice-band signal octets from the XP-PDU payload to the XP user.

The receiving XP entity may take actions based on the received Sequence Number values, but such actions must not increase the conveyance delay across the XP receiving entity to alleviate echo performance problems.

The XP receiving entity must accommodate a sudden increase or decrease in the nominal frame transfer delay. (A protection switching event in the RPR may result in a change of transfer delay.)

4) Guaranty of jitter and wander

The XP provides synchronous circuit transport for the voice-band signal.

NOTE 1—Example receiver techniques use a timing-based mechanism or a buffer-fill-based mechanism, possibly supplemented by a Sequence Number processing algorithm that does not introduce additional delay.

NOTE 2—For transporting signals of speech and 3.1 kHz audio bearer services as specified in 64 kbit/s ISDN, the need for A/μ-law conversion is identified. The conversion between A-law and μ-law coded PCM octets are as specified in Patent G.711. This conversion function is outside the scope of this Patent.

9.4.2.4 TCE Functions of High Quality Audio Signal

The case is the same as the above. The TCE functions of high quality audio signals in XP include the following capabilities in principle.

a) Consideration of XP user information;
b) Processing strategy of frame delay variation;
c) Processing of lost and duplicated frames;
d) Guaranty of jitter and wander;

9.5 XP Protocol Involved to Support TCE

The following sub-sections describe XP procedures to be provided for implementing XP functions involved to support TCE.

9.5.1 Processing Strategy of Frame Sequence Number (FSN)

9.5.1.1 Processing in the Transmit Side

The XP provides a sequence count value and a XP indication associated with each XP-PDU payload in the transmit side. The count value applied to FSN field starts with 0, is incremented sequentially to 63 and is numbered modulo 64 when FT field is set to support TCE function. When the data link frames carrying TCE payloads traverse a RPR or other topologies, then may arrive destination station disorderly. Due to this reason, it is required that frames must be delivered in order. Ensuring in-order delivery is also effective approach to out-of-order detection.

9.5.1.2 Processing in the Receive Side

The XP receives and derives the following information associated with each XP-PDU payload in receive side:
sequence number;
count;
check error of the frame sequence number and count.

The implementation of sequence count values and number will be specified on a service specific basis (e.g. REG_lost and REG_duplicated). The XP entity in the receive side identifies lost or duplicated XP-PDU payloads.

XP entity tracks the following status of dynamic data stream:
XP-PDU payload sequence number and count;
XP-PDU payload loss (if occur);
XP-PDU payload duplication (if occur).

There are two ways to solve the real-time processing problem, (1) try to reorder and sort into the correct order or (2) drop those disordering frames, when disordering case occurred. In implementation, These two methods should be all supported. If method (1) does not meet reliability transport and performance requirement still, the method (2) will be applied. Due to the limitation of native speed and acceptable delay of data link payloads listed in Table 14, this Patent does not support correction method for bit errors and frame losses.

9.5.2 Recovery Method of Timing and Structured Information

To support TCE services available in Table 14, the requirements of timing and structured information should be based on the native characteristics of the these services, and it is necessary for these TCEs to recover these signal characteristics as closely specified in the related standard as possible in the receive side, including the signal jitter, bit-rate, timing characteristics and structured information transfer (if it has) as it was sent. In most application, STRUCTURE information could be provided by the transform and adaptation function of Flow at the Flow interface within a node since XP uses pre-plan and connection oriented policy, and TCCR is made (e.g. ISDN 64 kbit/s Flow source in a node to ISDN 64 kbit/s Flow sink, E1 Flow source in a node to E1 Flow sink) by network management entity or control signalling before Flow service is operated on-line.

For the timing issue of MSF, the four methods that could be used to engineering projects are: (a) timing (synchronous) signalling broadcasted periodically from that designated station with an external synchronous source along the MSF or other topologies; (b) timing (synchronous) information received from an external facility for referencing to all stations; (c) timing (synchronous) information received from an external facility for referencing to a said central station, other stations along a ring will get timing information from the line side and reference to the central station. (d) No timing (synchronous) information and referencing to MAC sublayer. If the method (a) is applied, the primitives are defined as follows.

SYNCHRONIZATION Request (NA, T_sync)

The signalling frame of SYNCHRONIZATION Request primitive will have the highest priority among all other signalling frame defined in this Patent and be operated in a way of broadcast. The broadcasted period is Timer T_sync. Its default value is 8000 frames per second. This value is programmable and can be changed by network management entity.

SYNCHRONIZATION Confirm (Non parameter)

After getting the signalling frame of SYNCHRONIZATION Request, each station along a ring will align the phase relations of its oscillator facility (including frequency-locked) and send SYNCHRONIZATION Confirm signalling frame with lower priority to the source station initiated the signalling frame of SYNCHRONIZATION Request. The codes of these two signalling frames are listed in the Table 4.

Since the service types and connection relations of TCEs from source to destination, including Node address, FT and FN, are pre-plan before service Flow is operated, the initial timing (except for phase relations and actual bit-stream) and structured information should be pre-set by configuration function of network management entity before those TCE services are available. The phase relations and actual bit-stream of TCE signals are designed to perform the extraction of output transmission bit timing information from the received frame stream, and requires a phase-locking mechanism. It is recommended that method (d) is first choice in this Patent.

9.5.3 Services from MAC

The services provided from the MAC sublayer allow: a) The peer-to-peer Flow data exchange; b) The parameters exchange between MAC and XP entity; c) The data exchange across MSF by the bridge. The RPR MAC provides strict and relaxed frame transmission service. The MAC sublayer presents a service interface for the exchange of XP PDUs between XP entities. The MAC service interface supports service classes denoted class A, class B, and class C. For all service classes, the MAC service interface provides per ringlet indications to XP of whether traffic can or cannot currently be accepted. For service class C, the MAC service interface also provides the number of hops to the nearest congested station. Each service class is rate controlled to prevent XP from transmitting more traffic than was allocated or allowed by fairness, as applicable.

9.5.3.1 Services Class A

Class A (real-time service) service provides an allocated, guaranteed data rate and a low end-to-end delay and jitter bound. Within this class, there is a mechanism to reserve some or all of the allocated bandwidth. Fairness Eligible (FE) bit in the RPR header must always be set to 0 on class A traffic. Class A traffic moves through the primary transit path in each station as it propagates around the ring.

9.5.3.2 Services Class B

Class B (near real-time service, allocated or opportunistic) service provides an allocated, guaranteed data rate, optional additional data rate that is not allocated or guaranteed, and bounded end-to-end delay and jitter for the traffic within the allocated rate. Class B has similarities to the class A service and also has similarities to class C service, in which traffic beyond the allocated rate profile is subject to the fairness algorithm, and is marked by the MAC as such with the fairness eligible (FE) bit in the RPR header prior to transmission on the ring. In a single-queue or a dual-queue implementation, class B traffic moves through the primary transit path or secondary transit path, regardless of whether the frame is marked fairness eligible or not.

9.5.3.3 Services Class C

Class C (best-effort service, opportunistic) service provides a best-effort traffic service with no allocated or guaranteed data rate and no bounds on end-to-end delay or jitter. Class C traffic is always subject to the fairness algorithm, and is marked by the MAC as such with the fairness, eligible (FE) bit in the RPR header prior to transmission on the ring. In a single-queue implementation, class C traffic moves through the primary transit path. In a dual-queue implementation, class C traffic moves through the secondary transit path.

9.6 Management Function Involved to Support TCE

The following functions is required to be provided to the network management entity:

9.6.1 TCE Property (Including Structured Information of Data Stream) Mismatch Between the Source and Destination The related operation is described detailed and refer to section 5.6.

10 Flow Based Protection (FBP)

The Flow of this section is a logical service channel defined in section 3, such as Ethernet, TCEs with a fixed value of Flow Type (FT) and Flow Number (FN) in the frame format. The application scope of Flow based protection involved in this section is located at full-duplex point-to-point application only. The flow protection operation of half-duplex point-to-point, multicast and broadcast will not be the scope of this section. A Node of RPR can provide support of multiple EFBP and Multiple TFBP at the same time.

A 1+1 unidirectional protection architecture has one normal traffic signal (packet), one working flow, one protection flow and a logical bridge. At the source end, the normal traffic signal (packet) is logically bridged to both the working and protection flow. At the sink end, the normal traffic signal (packet) is selected from the better of the two flows. Due to the logical bridging, the 1+1 architecture does not allow an extra unprotected traffic signal (packet) to be provided.

A 1:N unidirectional protection architecture has N normal traffic signals (packet), N working flows and 1 protection flow which may have an extra traffic signal (packet) in case of no defect condition (or a fault indication) or external commands for the N working flows. The signals (packet) on the working flows are the normal traffic signals (packet). The signal (packet) on the protection flow may be either one of the normal traffic signals (packet), an extra traffic signal (packet), or the null signal (packet). At the source side, one of these signals (packet) is connected to the protection flow. At the sink side, the signals (packet) from the working flows are selected as the normal signals (packet). When a defect condition or a fault indication is detected on a working flow or under the influence of certain external commands, the transported signal (packet) is bridged to the protection flow. At the sink side, the signal from this protection flow is then selected.

10.1 Ethernet Flow Based Protection (EFBP)

When needed to support the EFBP Function, EFBP Function Unit embedded in the corresponding Flow part of XP entity as an attachment in XP entity will be activated by the configuration function of network management entity (this configuration function is performed either in the projection installation phase or MSF on-line operation phase) and the corresponding Flow is set to a Working Flow.

For Operation of 1+1 EFBP, it is needed to designate a mate Standby Flow with the same service property, source and destination. The payloads of the mate Working Flow and Standby Flow will carry the same traffic.

For 1:1 EFBP, it is also needed to designate a mate Standby Flow with the same service property, source and destination. The payloads of the Standby Flow use an extra traffic signal (packet) in case of no defect condition (or a fault indication) or external commands for the working flow (Once ETBP occurred for this Working Flow, the extra traffic transport will be stopped by a bridge function).

For 1:N EFBP, there are multiple Working Flows (e.g. number is N), it is also needed to designate a mate Standby Flow with the same service property, source and destination. The payloads of the Standby Flow can carry an extra traffic signal (packet) in case of no defect condition (or a fault indication) or external commands for the N working flow (Once EFBP in one of N Working Flow occurred, this additional traffic transport will be stopped by a bridge function).

The CS operational codes of EFBP are listed in the Table 15.

TABLE 15

Codes of ETBP frame

| CS Frame Types | Codes |
|---|---|
| 1+1 EFBP_Request Frame | 00100001 |
| 1+1_EFBP_Response Frame | 00100010 |
| 1:1 EFBP_Request Frame | 00100011 |
| 1:1_EFBP_Response Frame | 00100100 |
| 1:N EFBP_Request Frame | 00100101 |
| 1:N_EFBP_Response Frame | 00100110 |

Note 1:
1+1 and 1:1 EFBP_Request Frame is a multicast frame and should be issued to four ends of two targeted Flows (including the working and standby flows) at the same time.
1:N EFBP_Request Frame is a multicast frame and should be issued to multiple ends of targeted Flows (including the N working flows and a standby flow) at the same time.
Note 2:
Operation of Control frame for flow between MAC and client will be implemented via MA_Data Request and Indication primitives.

The parameters of 1+1 EFBP_Request Frame and 1:1 EFBP_Request Frame have the same format as that of the unicast mode of TCCR ID. This parameter consists of FNi ID (This is an identifier of Flow p within node x), 2-bit U/M/B field (6-bit is reserved and set to binary 000000), 8-bit length field (This filed is used to reflect the total number of Flow FNj ID following length field, its value should be binary 000001 00000001 for 1+1, binary 000010 00000001 for 1:1) and a FNj ID (This is an identifier of Flow q within node y).

FIG. 12 Shows Expressions of 1+1 and 1:1 Flow Protection Parameters.

Note: FNi ID=NAx(x=1,2,3 . . . 256)+FT+FNp (p=0,1,2, 3, . . . $2^{20}$−1), to identify the path Flow with the fixed FT and FN value within xth node. FNi ID and FNj ID stand for standby and working flow respectively.

The parameters of 1+1 EFBP_Response Frame and 1:1 EFBP_Response Frame are the same as that of 1+1 EFBP_Request Frame and 1:1 EFBP_Request Frame respectively.

The parameters of 1:N EFBP_Request Frame have the same format as that of the multicast/broadcast mode of TCCR ID. This parameter also consists of FNi ID (This is an identifier of Flow p within node x), 2-bit U/M/B field (6-bit is reserved and set to binary 000000), 8-bit length field (This filed is used to reflect the total number of Flow FNj ID following length field, its value should be binary 000011 00000100 if N=4) and a FNj ID (This is an identifier of Flow q within node y).

FIG. 13 Shows Expressions of 1:N Flow Protection Parameter.

Note: FNi ID=NAx(x=1,2,3 . . . 256)+FT+FNp (p=0,1,2, 3, . . . $2^{20}$−1), to identify the path Flow with the fixed FT and FN value within xth node. FNi ID is used to present standby flow, and FNi ID, FNk ID, FNl ID and FNm ID etc represent working flow, the total number is N.

The parameters of 1+1 EFBP_Response Frame, 1:1 EFBP_Response Frame and 1:N EFBP_Response Frame are specified in the Table 16.

TABLE 16

Parameters of EFBP_Response Frame

| CS Frame Types | Codes |
|---|---|
| EFBP successful | Binary "00000001 00010001 00000001 00000000" |
| EFBP unsuccessful | Binary "00000001 00010010 00000001 00000000" |

Note 1:
Operation of Control frame for flow between MAC and client will be implemented via MA_Data Request and Indication primitives.

The EFBP Function Unit is used to monitor the link status of receiving the peer link frames at the reference point T1/T2. It is local matter only and has not any associated frame to be used between the two sides.

After initialization (the defaults of T_efbp and N_efbp are set to 10 milliseconds and 4 respectively), the link entity enters the normal way of transmitter and receiver.

If the timer T_efbp expires before any MAC frame is received or status report from MAC layer by MA_CONTROL Indication or MA_DATA Indication occurs with one or more opcodes (receptionStatus, serviceClass, topochange, protchange), the link entity shall restart timer T_efbp and decrement the retransmission counter N_efbp.

If the timer T_efbp expires and retransmission counter N_efbp has been decremented to zero. before any MAC frame from the trunk is received or status report from MAC layer by MA_CONTROL Indication or MA_DATA Indication is kept still with one or more opcodes (receptionStatus, serviceClass, topochange, protchange), the link entity of the trunk shall inform the all local Flow entities (within a node), which are set to have the other protection Flow, and send a periodic Error-Hello message from entity of the trunk to those entities of Flow within that node.

After getting Error-Hello, the local Flow entity will perform an action of ETBP (1+1, 1:1 or 1:N) to the corresponding Standby Flow within the same node, change previous transmission channel of trunk to the counter-rotating ringlet of pre-setting. After the entity of Flow enters into the normal transmission operation, the local trunk entity will restart timer T_efbp and recover the value of N_efbp. Every Standby Flow has its T_efbp and N_efbp of itself.

For the case of 1:1 and 1:N, after the EFBP Function Unit receives a periodic Error-Hello message, the link entity in the transmit side will perform an action of EFBP (1:1 or 1:N) to the corresponding Standby Flow.

The value of T_efbp and N_efbp shall be configurable. The minimum unit configured of T_efbp and N_efbp is 1 milliseconds and 1 respectively.

Once EFBP Function Unit detects that the failure span is recovered and enters normal status from the EFBP (that is, stop Error-Hello Message), EFBP Function Unit will wait T_efbp_wtr (The default to 10 minutes, its value is also programmable and should be much greater than T_efbp), and then switch to the Working Flow. After switching to the Working Flow, EFBP Function Unit issues, an EFBP_RECOVERY_EVENT_Report with parameters of FT and FN to network management entity.

10.2 TCE Flow Based Protection (TFBP)

When needed to support the TFBP function, TFBP Function Unit embedded in the corresponding Flow in XP entity will be activated by the configuration of network management (this configuration is performed either in the projection installation phase or on-line operation phase) and the corresponding Flow is set to a Working Flow.

For Operation of 1+1 TFBP, it is needed to designate a mate Standby Flow with the same service property, source and sink. The payloads of the mate Working Flow and Standby Flow carrying the same traffic are required.

For 1:1 TFBP, it is also needed to designate a mate Standby Flow with the same service property, source and sink. The payloads of the Standby Flow can run an extra traffic signal (packet) in case of no defect condition (or a fault indication) or external commands for the working flow (Once TFBP occurred for this Working Flow, the extra traffic transport will be stopped by a bridge function).

For 1:N TFBP, there are N Working Flows; it is also needed to designate a mate Standby Flow with the same service property, source and sink. The payloads of the Standby Flow can run an extra traffic signal (packet) in case of no defect condition (or a fault indication) or external commands for the working flow (Once TFBP in one of N Working Flow occurred, this additional traffic transport will be stopped by a bridge function).

The CS operational codes of TFBP are listed in the Table 17.

TABLE 17

Codes of TFBP frame

| CS Frame Types | Codes |
|---|---|
| 1+1 TFBP__Request Frame | 00100111 |
| 1+1__TFBP__Response Frame | 00101000 |
| 1:1 TFBP__Request Frame | 00101001 |
| 1:1__TFBP__Response Frame | 00101010 |
| 1:N TFBP__Request Frame | 00101011 |
| 1:N__TFBP__Response Frame | 00101100 |
| TFBP__RECOVERY__EVENT__Report | 00101101 |

Note 1:
Operation of Control frame for flow between MAC and client will be implemented via MA__Data Request and Indication primitives.
Note 2:
1+1 and 1:1 TFBP__Request Frame is a multicast frame and should be issued to four ends of two targeted Flows (including the working and standby flows) at the same time.
1:N TFBP__Request Frame is a multicast frame and should be issued to multiple ends of targeted Flows (including the N working flows and a standby flow) at the same time.

The parameters of the 1+1, 1:1 and 1:N TFBP Response fame in this sub-section are specified in Table 18.

TABLE 18

Parameters of Bandwidth Limitation__Response Frame

| CS Frame Types | Codes |
|---|---|
| TFBP successful | Binary "00000001 00010011 00000001 00000000" |
| TFBP unsuccessful | Binary "00000001 00010100 00000001 00000000" |

Note 1:
Operation of Control frame for flow between MAC and client will be implemented via MA__Data Request and Indication primitives The parameters of 1+1 TFBP_Request Frame and 1:1 TFBP_Request Frame have the same format as that of the unicast mode of TCCR ID. This parameter consists of FNi ID (This is an identifier of Flow p within node x), 2-bit U/M/B field (6-bit is reserved and set to binary 000000), 8-bit length field (This filed is used to reflect the total number of Flow FNj ID following length field, its value should be binary 000000 00000001) and a FNj ID (This is an identifier of Flow q within node y).

Figure 14:
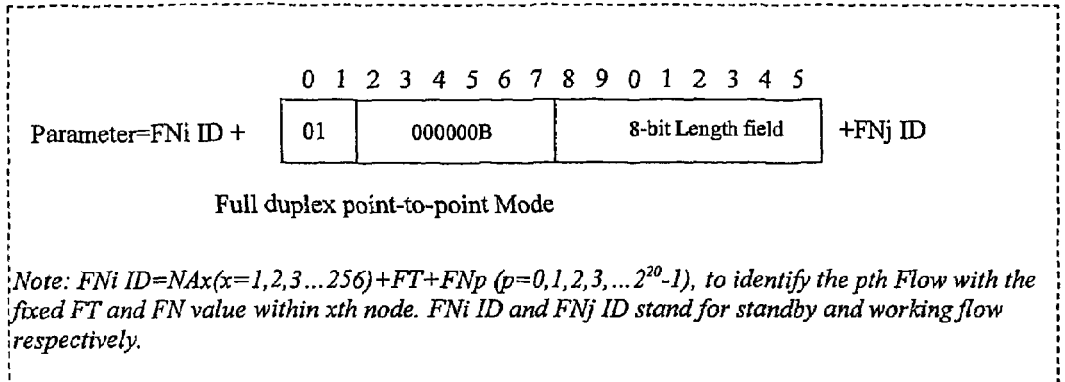
FIG. 14 shows Expressions of 1+1 and 1:1 flow protection parameters.

FIG. 14 Shows Expressions of 1+1 and 1:1 Flow Protection Parameters.

Note: FNi ID=NAx(x=1,2,3 . . . 256)+FT+FNp (p=0,1,2, 3, . . . $2^{20}$−1), to identify the path Flow with the fixed FT and FN value within xth node. FNi ID and FNj ID stand for standby and working flow respectively.

The parameters of 1+1 TFBP_Response Frame and 1:1 TFBP_Response Frame are the same as that of Request primitives above.

The parameters of 1:N TFBP_Request Frame have the same format as that of the multicast/broadcast mode of TCCR ID. This parameter also consists of FNi ID (his is an identifier of Flow p within node x), 2-bit U/M/B field (6-bit is reserved and set to binary 000000), 8-bit length field (This filed is used to reflect the total number of Flow FNj ID following length field, its value should be binary 000000 00000001) and a FNj ID (This is an identifier of Flow q within node y). Please refer to as FIG. 15.

Figure 15:
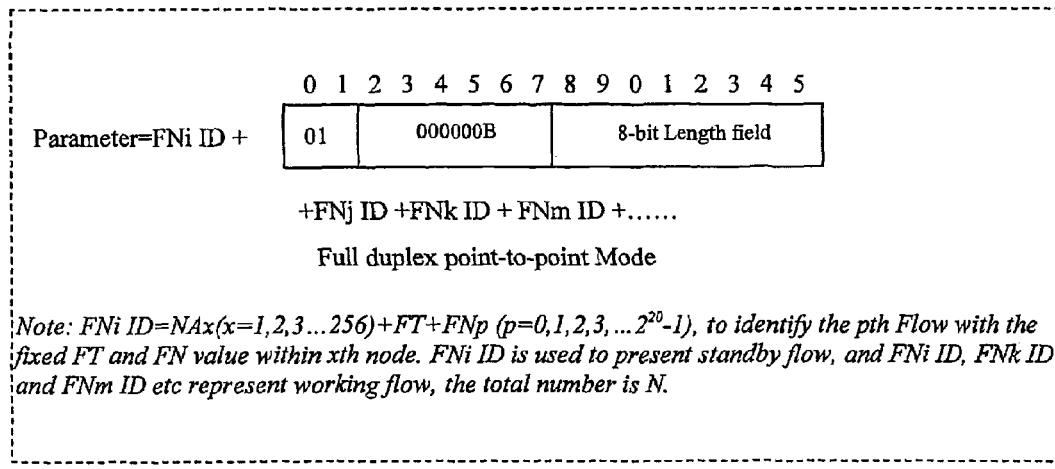
FIG. 15 shows Expressions of 1:N flow protection parameter.

FIG. 15 Shows Expressions of 1:N Flow Protection Parameter.

Note: FNi ID=NAx(x=1,2,3 . . . 256)+FT+FNp (p=0,1,2, 3, . . . $2^{20}$−1), to identify the path Flow with the fixed FT and FN value within xth node. FNi ID is used to present standby flow, and FNi ID, FNk ID and FNm ID etc represent working flow, the total number is N.

The TFBP Function Unit is used to monitor the link status of Flow by monitoring the peer link frames of an trunk. Normally, the entity in the receive side of trunk does always receive or transit the MAC frame from the upstream node. No link-error occurs and no Error-Hello is also sent to the local Flow entity within a node. It is local matter only and has not any associated frame to be used between the two sides.

After initialization (the defaults of T_tfbp and N_tfbp are set to 10 milli-seconds and 3 respectively), the link entity enters the normal way of transmitter and receiver.

If the timer T_tfbp expires before any MAC frame from the trunk is received or status report from MAC layer by MA_CONTROL Indication or MA_DATA Indication occurs with one or more opcodes (receptionStatus, serviceClass, topochange, protchange), the link entity of trunk shall restart timer T_tfbp and decrement the retransmission counter N_tfbp.

If the timer T_tfbp expires and retransmission counter N_tfbp has been decremented to zero before any MAC frame from the trunk is received or status report from MAC layer by MA_CONTROL Indication or MA_DATA Indication occurs with one or more opcodes (receptionStatus, serviceClass, topochange, protchange), the link entity of the trunk shall inform the all local Flow entities (within a node), which are set to have the related protection switch flag to other protection Flow, and send a Error-Hello message from the trunk entity to those entities of Flow within that node. After getting Error-Hello, the local Flow entity will perform an action of TFBP (1+1, 1:1 or 1:N) to the corresponding Standby Flow within the same node, change previous transmission channel of trunk to the counter-rotating ringlet of pre-setting. After the entity of Flow enters into the normal transmission operation, the local trunk entity will restart timer T_tfbp and recover the value of N_tfbp. Every Standby Flow has its T_tfbp and N_tfbp of itself.

The value of T_tfbp and N_tfbp shall be configurable. The minimum unit configured of T_tfbp and N_tfbp is 1 milliseconds and 1 respectively.

Once TFBP Function Unit detects that the failure span is recovered and enters normal status from the TFBP, TFBP Function Unit will wait T_tfbp_wtr (The default to 10 minutes, its value is also programmable and should be much greater than T_tfbp), and then switch to the Working Flow. After switching to the Working Flow, TFBP Function Unit issues a TFBP_RECOVERY_EVENT_Report with parameters of FT and FN to network management entity.

11 Flow Based Multicast (FBM)

The Flow of this section is a logical service channel defined in section 3, such as TCE or Ethernet with a fixed value of Flow Type (FT) and Flow Number (FN) in the MSF frame. The application scope of Flow Based Multicast (FBM) is located at the operation of half-duplex point-to-multi-point only. The full-duplex point-to-point will not be recommended to the scope of this section.

The FBM Function Unit built in a Node is defined to support one or more independent hierarch of multicast (or broadcast) possibly involved the same or different FT at the same time. FBM Function Unit implements a duplication function within a node (station) from a Flow getting a payload of a frame from the related topologies to other multiple Flow with the same FT value and with being set to have a relation of membership group. A group of FN with the same FT value within a Node can be set to become a membership group of multicast/broadcast. It is required that a designated Flow in the membership group should receive data frames at the reference point G1 from the related topologies. All designated Flow in the membership group is only allowed to get packets from ST, and is not permitted to receive all other data packets. This Patent defines the specific designated flow that gets the node based packet from MSF, as a Source Flow (ST). Once getting data frames either from MAC frame or from flow side, the ST duplicates those frames to every Flow in the corresponding membership group within a node. The ST should be set and designated to a given value of FT and FN by network management entity during the project installation phase or on-line operation phase. The one or more STs can be designated or changed dynamically within a node according to the customer requirements.

The CS operational codes of TBM are listed in the Table 19.

TABLE 19

Codes of TBM frame

| CS Frame Types | Codes |
|---|---|
| FBM_Request Frame | 00101101 |
| FBM_Response Frame | 00101110 |

Note 1:
Operation of Control frame for flow between MAC and client will be implemented via MA_Data Request and Indication primitives.

If a FBP is applied to operation of FBM, it is recommended that a ST be designated to a Working Flow, and the ST can also be operated to become the working Flow of 1+1 and 1:1 application described in section 10.1 and 10.2.

The parameters of FBM_Request and FBM_Response frame in this sub-section are specified in Table 20 if the multicast/broadcast field is changed from "01" to "10" or "11".

TABLE 20

Parameters of FBM_Response Frame

| CS Frame Types | Codes |
|---|---|
| FBM successful | Binary "00000001 00010101 00000001 00000000" |
| FBM unsuccessful | Binary "00000001 00010110 00000001 00000000" |

Note 1:
Operation of Control frame for flow between MAC and client will be implemented via MA_Data Request and Indication primitives.

12 Bandwidth Policing, Merging, Line-Speed Filtering, Stacking and Mirroring of Flow

12.1 Flow Based Policing—Bandwidth Limitation with Symmetry and Asymmetry

TCE rate at XP service boundary should be operated and be fully compliant with the IEEE 802.3, G.702, ISDN and other related standards in the normal case. But in some application of service level agreement, the policy of operation and maintenance needs a limitation for rate to perform the bandwidth-based accounting. The MSF entity provides a Bandwidth Limitation Function Unit. When this Function Unit is activated to a Flow, this Flow provides configuration incremental level with minimum unit granularity (64 k/bits for TCE) from 0 to the specified value the related standard defined. The corresponding standard values of bandwidth are specified in the related standard and must not be passed over. Once bandwidth is set up for a Flow during project installation or on-line operation phase, this programmable threshold limit applies to this Flow and its corresponding port. The setting of bandwidth threshold and monitoring of actual traffic flow are performed by configuration function and management entity.

The CS operational codes of Bandwidth Limitation are listed in the Table 21.

TABLE 21

Codes of Bandwidth Limitation frame

| CS Frame Types | Codes |
|---|---|
| Bandwidth Limitation_Request Frame | 00101111 |
| Bandwidth Limitation_Response Frame | 00110000 |

Note 1:
Operation of Control frame for flow between MAC and client will be implemented via MA_Data Request and Indication primitives.
Note 2:
Bandwidth Limitation_Request Frame is a multicast frame and should be issued to two ends of targeted Flow at the same time.

The parameter of Bandwidth Limitation_Request Frame includes the following elements:

Targeted (Flow) Port A: FNi=NAx+FT+FNp

Targeted (Flow) Port B: FNj=NAy+FT+FNq

Bandwidth required to be provided from Port A to Port B: a designated integer value (an octet) between 0 and Standard Bandwidth, e.g. binary code:01000100 represents 68*64 k/bits Bandwidth.

Bandwidth required to be provided from B to A: a designated integer value (an octet) between 0 and Standard Bandwidth, e.g. binary code:00100000 represents 32*64 k/bits Bandwidth (This is an example of asymmetrical bandwidth availability), binary code:00000000 represents no Bandwidth available, it is needed that customers use the operation of half duplex point-to-point from port A to port B.

Standard Bandwidth: the related standard (binary code of G.702 E1: 00100000) for TCE Minimum Granularity: 64 k/bits (binary code:00000001) for TCE Bandwidth from port A to port B and from port B to port A is independent each other. The separated bandwidth can be symmetrical or asymmetrical. All of these elements are mapped to CS frame in the above order. Bandwidth Limitation_Response Frame uses two parameters: Bandwidth Limitation successful or Bandwidth Limitation unsuccessful shown in the Table 22.

TABLE 22

Parameters of Bandwidth Limitation_Response Frame

| CS Frame Types | Codes |
|---|---|
| Bandwidth Limitation successful | Binary "00000001 00010111 00000001 00000000" |
| Bandwidth Limitation unsuccessful | Binary "00000001 00011000 00000001 00000000" |

Note 1:
Operation of Control frame for flow between MAC and client will be implemented via MA_Data Request and Indication primitives.

Bandwidth Limitation of Flow Based can be used to operations of half duplex point-to-point, full duplex point-to-point, multicast and broadcast.

12.2 Flow Merging with Symmetry and Asymmetry

The MSF entity provides a Merging Function Unit by which up to sixteen Flows of the same FT can be merged together to form a Flow Merging Group (TMG). Up to eight TMGs can be established in a MSF or other topology node. The TMG is similar to one logical link and is very useful when the higher bandwidth of application is required. The member Flow of a TMG must be of the same FT and configured in full-duplex mode. The benefits of forming a TMG are link redundancy, trunk throughput, incremental bandwidth and load balancing on the TMGs. Once a TMG is formed, a TMG of TCE must be identified using only a FN value (It is usual the first member Flow) in the corresponding frames of data, signalling and network management. For the upper layer application over a TMG, a logical channel can only be seen externally.

The CS operational codes of Flow Merging are listed in the Table 23.

TABLE 23

Codes of Flow Merging frame

| CS Frame Types | Codes |
| --- | --- |
| Flow Merging_Request Frame | 00110001 |
| Flow Merging_Response Frame | 00110010 |

Note 1:
Operation of Control frame for flow between MAC and client will be implemented via MA_Data Request and Indication primitives.

The parameter of Flow Merging_Request Frame includes the following elements:
First Targeted Flow: FNi=NAx+FT+FNp
Second Targeted Flow: FNj=NAy+FT+FNq
Third Targeted Flow: FNk=NAz+FT+FNr
Fourth Targeted Flow: . . .

Flow Merging from A to B and from B to A is independent each other. The Flow Merging of two half-duplex channels can be symmetrical or asymmetrical. All of these elements will be mapped to CS control frame in the above order. Flow Merging_Response Frame uses two parameters: Flow_Merging_successful or Flow_Merging_unsuccessful shown in the Table 24.

TABLE 24

Parameters of Flow Merging_Response Frame

| CS Frame Types | Codes |
| --- | --- |
| Flow_Merging_successful | Binary "00000001 00011001 00000001 00000000" |
| Flow_Merging_unsuccessful | Binary "00000001 00011010 00000001 00000000" |

Note 1:
Operation of Control frame for flow between MAC and client will be implemented via MA_Data Request and Indication primitives.

Flow Merging can be used to operations of half duplex point-to-point and full duplex point-to-point.

12.3 Flow Based Security—Line-Speed Filtering

The MSF entity provides a Line-Speed Filtering Function Unit (LSFFU) of Flow based to Content-Aware frame classification, which enables a node processing application to filter and classify frames based on certain protocol fields of upper layer in the payload of frame. Filters can be set on the defined fields from Layer 2 to Layer 4 within a frame. LSFFU of a node can filter individual ingress or egress ports of Flow. Filtering algorithm uses two constructs, (a) the filter mask, which defines which fields to filter, and (b) the rules table, which defines the filtering options. Up to 48 filters are available, each containing a 64-octet wide shuttered filter mask value to apply on any protocol field at any offset within the first 96 octets of the incoming frame. The rule table is up to 256 entries deep for TCE Flow.

Once the classification results and filter match or partial match have been gotten, the following policies can be taken, or in their combination:

Modification of the IP Type Of Service (TOS precedence) field

Delivery of a copy of the related frames to the domain of management

Discarding the related frames

Transferring the related frames to other egress port of a Flow

Transmission of a copy of the related frames to the "mirrored to" Flow

Modification of protocol field

The LSFFU provides the ability to track and profile up to 1024 data flows. The traffic on these data flows can be monitored or regulated via internal meters and has the ability to assign two independent policies to the profile status of a data flow and execute these actions at line rate.

The CS operational codes of Line-Speed Filtering are listed in the Table 25.

TABLE 25

Codes of Line-Speed Filtering frame

| CS Frame Types | Codes |
| --- | --- |
| Line-Speed Filtering_Request Frame | 00110011 |
| Line-Speed Filtering_Response Frame | 00110100 |

Note 1:
Operation of Control frame for flow between MAC and client will be implemented via MA_Data Request and Indication primitives.

The parameter of Line-Speed Filtering_Request Frame includes the following elements:
Targeted Flow: FNi=NAx+FT+FNp Modification of the IP Type Of Service (TOS precedence) field, binary code: 10000001, the detailed operation is under study. Otherwise, binary code: 00000000 will be used.

Delivery of a copy of the related frames to the domain of management, binary code: 10000010 represents that action of "Delivery of a copy of the related frames to the domain of management" will be taken. Otherwise, binary code: 00000000 will be used.

Discarding the related frames, binary code: 10000011 represents that action of "Discarding the related frames" will be taken. Otherwise, binary code: 00000000 will be used.

Transferring the related frames to other egress port of a Flow, binary code: 10000100 represents that action of "Transferring the related frames to other egress port of a Flow (This Flow is presented as FNj=NAx+FT+FNq)" will be taken. So the octet "10000100" plus "FNj" will be used for this function. Otherwise, binary code: 00000000 will be used.

Modification of protocol field, binary code: 10000101, the detailed operation is under study. Otherwise, binary code:00000000 will be used.

Line-Speed Filtering from A to B and from B to A is independent each other. The Line-Speed Filtering of two half-duplex channels can be selected to use or not use. All of these elements will be mapped to CS frame in the above order. Line-Speed Filtering_Response Frame uses two parameters: Line-Speed Filtering successful or Line-Speed Filtering unsuccessful shown in the Table 26.

TABLE 26

Parameters of Line-Speed Filtering_Response Frame

| CS Frame Types | Codes |
| --- | --- |
| Line-Speed_Filtering_successful | Binary "00000001 00011011 00000001 00000000" |
| Line-Speed_Filtering_unsuccessful | Binary "00000001 00011100 00000001 00000000" |

Note 1:
Operation of Control frame for flow between MAC and client will be implemented via MA_Data Request and Indication primitives.

Flow Merging can be used to point-to-point operations of both half duplex and full duplex.

Figure 16:
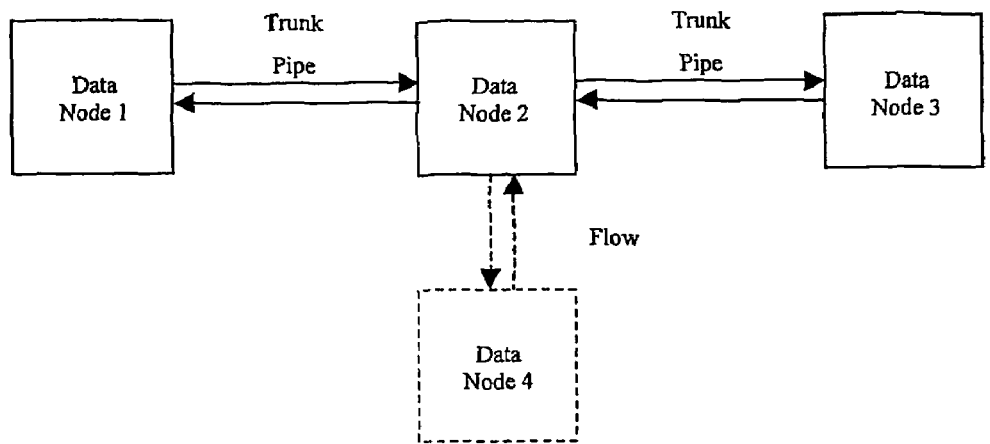
FIG. 16 shows A MSF Topology, Link-type with Adding and Dropping Flow Services.

13 Topology Application of Link-type, Broadcast Network and Pseudo-mesh 13.1 Support of a Link-type with Adding and Dropping Flow Services In some application, it is needed to build a link-type topology shown in the FIG. 16 in which the connection between Node 2 and Node 4 (it is suppositional) is one or more Flows. This Flow may be a Flow of other MSF. If the topology is involved in FIG. 16, steering and wrapping, data node insertion and deletion, fairness should not be used. Instead, these functions will be switched off via configuration function of the network management. Link-type Network bi-directional can be supported by RPR MAC depending on topology/protection mechanisms being disabled. MA_DATA.request is currently specified to allow a packet to be sent with Wrap Disable, Protection Disable, and Steering Disable by explicitly requesting a particular ringlet with no protection. Requires further study to determine if other MAC mechanisms would prevent this request from being fulfilled. The data and control packet will share the same channel and RI (Ringlet Identifier) field is always set to "0".

FIG. 16 Shows a MSF Topology, Link-type with Adding and Dropping Flow Services.

Figure 17:
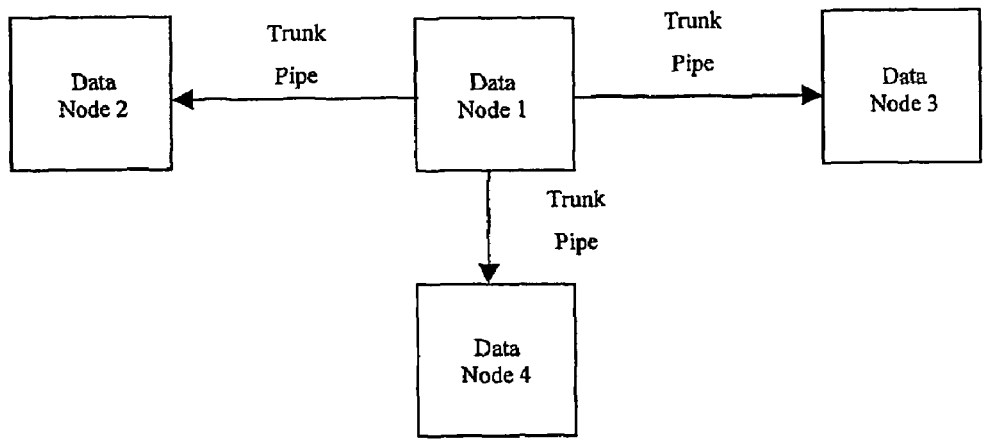
FIG. 17 shows A MSF Topology, Broadcast Connection to DVB Application.

FIG. 17 Shows a MSF Topology, Broadcast Connection to DVB Application.

Figure 18:
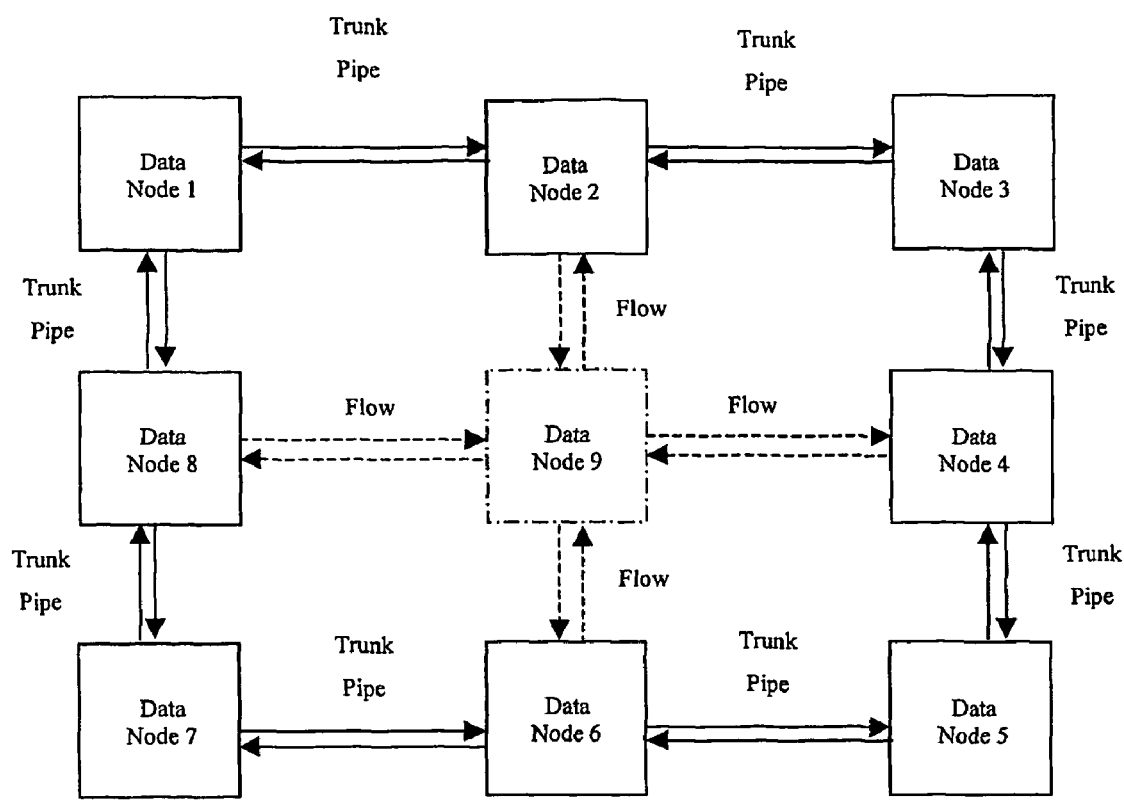
FIG. 18 shows A MSF Topology, Pseudo-mesh Connection.

FIG. 18 Shows a MSF Topology, Pseudo-mesh Connection.

13.2 Support of a Broadcast Connection to DVB Application

In DVB application for example, it is needed to build a broadcast network topology shown in the FIG. 17 in which the connections from Node 1 to Node2/3/4 are trunk pipes of single direction. If the topology is involved in FIG. 17, the protection switch of trunk pipe based, steering and wrapping, data node insertion and deletion, Flow based Protection and in-band network management should not be used. Instead, these functions will be switched off via configuration function of the network management. Broadcast Network—unidirectional may be supported by RPR MAC depending on topology/protection mechanisms being disabled. MA_DATA.request is currently specified to allow a packet to be sent with Wrap Disable, Protection Disable, and Steering Disable by explicitly requesting a particular ringlet with no protection. Requires further study to determine if other MAC mechanisms would prevent this request from being fulfilled. The data and control packet will share the same channel and RI (Ringlet Identifier) field is always set to "0".

13.3 Support of a Pseudo-mesh Topology

Pseudo-mesh Topology presented in FIG. 18 is a particular example of a two-fibre ring. Eight Nodes via trunk pipe are attached together to form a ring. The Flows of Node 2, 4, 6 and 8 are connected to the Node 9 (it is suppositional) by flows. In this application, all function and specifications defined in this Patent can be used effectively. Flow cross-connection is concentrated and scheduled on the Node 9.

INDUSTRIAL APPLICABILITY

The present invention can provide the following capabilities:

(1) The Technology encapsulation and transport of Ethernet, Frame Relay, G.702 PDH circuit—Synchronous and asynchronous circuit transport, Video signal, voice-band signal, Digital channel supported by 64 kbit/s-based ISDN etc over a two-fibre ring, a link-type and broadcast topology of fibres.

(2) Service (or flow) based protection of 1+1, 1:1, and 1:N models within 50 ms.

(3) Service (or flow) based multicast and station-based multicast and broadcast.

(4) Bandwidth limitation of service (or flow) based with symmetry and asymmetry.

(5) Flow merging with symmetry and asymmetry.

(6) Line-speed filtering of flow based.

(7) Flow based performance monitoring in 15-minute and 24-hour.

(8) Mirroring of flow.

(9) Frame based transparent PPPoE and PPPoA transport from access to backbone along a MSF ring or other topologies, in order to simplify accounting mechanism (e.g. Radius), reduce maintenance work, and improve latency variation (compared to Layer 2 and Layer 3 switch) in Access network application.

It is to be understood that the above descriptions should not be construed as limitations on the scope of the invention, but rather as an exemplification of preferred embodiments thereof. Accordingly, the scope of the invention should be determined by the appended claims and their equivalents. Any variations or modifications within the spirit and scope of the invention are covered by the appended claims.

The invention claimed is:

1. A data transmission apparatus for implementing multiple service flow (MSF) in a multiple service ring (MSR) including a trunk pipe and at least two nodes each with at least one flow, said apparatus comprising:
a flow Rx framer coupled to said flows for converting data received from said flows into data packets of a predetermined protocol;
a transmission setup device for setting-up information indicating the destination node address and destination flow for packets of said predetermined protocol to be transmitted; and
a Tx framer for encapsulating said information indicating the destination node address and destination flow and the packets of said predetermined protocol into frames of the multiple service ring and transmitting the frames along said trunk pipe to a downstream neighbor node along the ring,
wherein said multiple service ring is a dual-ring structure consisting of a pair of unidirectional count-rotating ringlets, said multiple service flow is based on RPR, and said Rx framer is RPR Rx framer and said Tx framer is RPR Tx framer.

2. The data transmission apparatus according to claim 1, wherein said predetermined protocol is a XP processing protocol, and said apparatus further comprising:
a Rx framer for receiving and de-framing data frames of the multiple service ring from a upstream neighbor node along said trunk pipe to obtain at least a destination node address and XP packets; and
a transiting device for transiting the frames destined to other nodes to said Tx framer so as to forward the frames destined to other nodes to a next node.

3. The data transmission apparatus according to claim 2, further comprising:
a destination flow determining means for determining a destination flow of the XP packets for a Universally or locally administered address; and
a flow Tx framer for converting said XP packets for a node with a Universally or Locally administered address from the Rx framer into data of format of local flow and sending the local flow data to a corresponding flow determined by said destination flow determining means.

4. The data transmission apparatus according to claim 3, wherein said destination flow determining means includes a discriminator for determining whether said received packets for a node with a Universally or Locally administered address are unicast, multicast or broadcast; a flow member copying means for making copies of the packets for each of the corresponding flow if multicast or broadcast is determined within a membership group in a node; and flow identifier determining means for determining destination flow from FT and FN fields in the received frames.

5. The data transmission apparatus according to claim 4, wherein said transmission setup means sets up destination node address NA, and FT and FN fields for indicating the type and NO. of the destination flow.

6. The data transmission apparatus according to claim 5, further comprising a Tx schedule unit for scheduling the transmission of data frames according to a priority of the frames, and decide which frame will go first to the downstream along the ringlet.

7. The data transmission apparatus according to claim 6, further comprising a flow based protection FBP unit for performing flow based protection to provide at least one flow to be used as a standby in case of failure of the used flows.

8. The data transmission apparatus according to claim 7, wherein said FBP unit provides 1+1 FBP to designate a mate Standby Flow with the same service property, source and sink in which payloads of the mate Working Flow and Standby Flow carries the same traffic, and once FBP occurred for this working flow, said standby will replace this working flow within 50 ms.

9. The data transmission apparatus according to claim 7, wherein said FBP unit provides 1:1 FBP to designate a mate Standby Flow with the same service property, source and sink in which payloads of the Standby Flow can run the other additional traffic, and once FBP occurred for this Working Flow, the additional traffic will be dropped out within 50 ms.

10. The data transmission apparatus according to claim 7, wherein said FBP unit provides 1:N FBP to designate a mate Standby Flow with the same service property, source and sink in which payloads of the Standby Flow runs the other additional traffic, and once FBP in one of N Working Flow occurred, this additional traffic will be dropped out within 50 ms.

11. The data transmission apparatus according to claim 7, wherein said FBP unit is for one of Ethernet and TCE.

12. The data transmission apparatus according to claim 11, wherein said MSF uses Fairness arithmetic and supports both local address and global node address, said local address is PLAS that is an address of node link on the MSF ring and has local meaning only along the MSF ring.

13. The data transmission apparatus according to claim 5, further comprising a frame sequence number generator for generating frame sequence number sequentially with respect to a specified modulus for each of the data frames to be transmitted at the transmitting side; and
at the receiving side, a FSN extractor for extracting a FSN with respect to a peer-to-peer modulus from the received data frames; a counter at the receiving side for counting the number of the received data frames; and a comparator for comparing the counted frame number with the extracted FSN, if mismatch, an error reflecting transport performance is indicated.

14. The data transmission apparatus according to claim 13, wherein said destination flow determining means gets at least one of PT, PFI, a value of FT/CS/NM, FN and FSN from the received frames from the upstream node, and said transmission setup means attaches PT, PFI, a value of FT/CS/NM, FN and FSN into the data frames to be transmitted.

15. The data transmission apparatus according to claim 14, wherein said RPR Rx framer, RPR Tx framer and the transiting means are of IEEE802.17 MAC layer; said flow Rx framer, said transmission setup means, and said destination flow determining means, said FSN generator, FSN extractor, counter, comparator, and flow Tx framer are of the XP layer.

16. The data transmission apparatus according to claim 15, further comprising a flow adaptation function unit having functions of the signal and rate transform, synchronous function between flow Rx/Tx framer and flow service interface, and said flow adaptation function unit is of a flow processing layer.

17. The data transmission apparatus according to claim 16, wherein said flow processing layer is a upper layer of said XP layer, said XP layer is a upper layer of said IEEE802.17 MAC layer, and corresponding interfaces are provided between the respective layers.

18. The data transmission apparatus according to claim 15, further comprising a shaper for generating a rate-limiting indication so as to reject excessive transmissions and avoid overflow, and said shaper is of XP layer.

19. The data transmission apparatus according to claim 3, wherein said frame includes at lease one of a RPR header field, Extended protocol field, PT field, PFI field, Reserved fields, FT/CS/NM field, EN field, FSN field, HEC field, payload of XP, and XP payload FCS.

20. The data transmission apparatus according to claim 3, wherein a network of said MSF is divided into a XP layer network that provides the transport of adapted information through a XP trail between XP access points and a MDL layer network that provides the transport of adapted information through a MDL trail between access points.

21. The data transmission apparatus according to claim 20, further comprising a co-located XP trail termination source and sink pair, said XP trail termination source accepts adapted information at its input, adds the flow traffic, inserts CS or NM packets and presents the characteristic information of the XP layer network at its output, and said XP trail termination sink accepts the characteristic information of the XP layer network at its input, terminates the flow traffic, extracts the CS or NM packets and presents the adapted information at its output, wherein said XP trail termination source and sink pair is of XP layer network.

22. The data transmission apparatus according to claim 20, further comprising a co-located MDL trail termination source and sink pair, said MDL trail termination source accepts adapted information at its input, inserts CS or NM packets and presents the characteristic information of the MDL layer network at its output, said MDL trail termination sink accepts the characteristic information of the MDL layer network at its input, removes the CS or NM packets and presents the adapted information at its output, wherein said MDL trail termination source and sink pair is of MDL layer network.

23. The data transmission apparatus according to claim 20, wherein said MSF network provides the information transfer capability required to support various types of services of different bit rates by various server layers, and offers a XP trail and uses the XP trail in a server layer network.

24. The data transmission apparatus according to claim 20, further comprising a co-located pair of XP/Client adaptation source and sink, said XP/Client adaptation source performs the function of Adding XP header between its input and its output, and said XP/Client adaptation sink performs the function of Remove XP header between its input and its output.

25. The data transmission apparatus according to claim 20, further comprising a co-located pair of MDL/XP adaptation source and sink, said MDL/XP adaptation source performs the functions of packet multiplexing and adding MDL header between its input and its output, and said MDL/XP adaptation sink performs the functions of packet de-multiplexing according to flow number value and MDL header extraction between its input and its output.

26. The data transmission apparatus according to claim 20, wherein said MSF network provides a point-to-multipoint MDL Network Connection/Flow that multicasts customer traffic from single node to a group of nodes; and a point-to-multipoint XP Network Connection that multicasts customer traffic within a single node, from an MDL/XP adaptation sink to multiple XP/Server adaptation sinks.

27. The data transmission apparatus according to claim 1, wherein said transiting means transits the frames destined to other nodes at a fast and almost fixed rate.

28. The data transmission apparatus according to claim 1, wherein said flows include at least one of Ethernet, TDM Circuit Emulation including the emulation of G.707 SDH circuit—Transport of TU-11, TU-12 or TU-2, G.702 PDH circuit—Synchronous and asynchronous circuit transport, Video signal, Voiceband signal, Digital channel supported by 64 kbit/s-based ISDN, and an trunk pipe of other MSR span with a lower rate than that of this trunk pipe.

29. The data transmission apparatus according to claim 1, further comprising: a flow based multicasting unit for duplicating data frames from a source flow getting a payload of the frame to other multiple flows with the same FT field value within a node.

30. The data transmission apparatus according to claim 1, further comprising: a bandwidth limitation unit for providing bandwidth limitation to a specific flow.

31. The data transmission apparatus according to claim 1, further comprising: a merging unit for merging plural flows of the same FT field value to form a flow merging group (FMG) similar to one logical link.

32. The data transmission apparatus according to claim 1, further comprising: a line speed filtering unit for filtering and classifying frames based on certain protocol fields of upper layer in the payload of frame.

33. The data transmission apparatus according to claim 1, further comprising: a flow mirroring unit for monitoring the incoming or outgoing traffic on a related flow by connecting a sniffer to a "mirrored to" flow.

34. A multiple service ring system comprising a plurality of nodes, each node including a data transmission apparatus for implementing multiple service flow (MSF) in a multiple service ring (MSR) including a trunk pipe and at least two nodes each with at least one flow, said apparatus comprising:
- a flow Rx framer coupled to said flows for converting data received from said flows into data packets of a predetermined protocol;
- a transmission setup device for setting-up information indicating the destination node address and destination flow for packets of said predetermined protocol to be transmitted; and
- a Tx framer for encapsulating said information indicating the destination node address and destination flow and the packets of said predetermined protocol into frames of the multiple service ring and transmitting the same along said trunk pipe to a downstream neighbor node along the ring,
- wherein said multiple service ring is a dual-ring structure consisting of a pair of unidirectional count-rotating ringlets, said multiple service flow is based on RPR, and said Rx framer is RPR Rx framer and said Tx framer is RPR Tx framer,
- wherein each of said nodes is assigned a node address (NA), and data incoming to a node contains a destination node address, and said destination node address is XOR'ed with the NA of node with a Universally or Locally administered address to check for match or mismatch.

35. The system according to claim 34, wherein an external timing source is provided to one of the nodes along the ring, and the other nodes make reference to the timing signaling from said one node for synchronization.

36. The system according to claim 35, wherein said nodes are coupled in a double fibre ring or a single fibre ring.

37. The system according to claim 35, wherein one of the nodes is only coupled to another node with a flow.

38. The system according to claim 35, wherein one of the nodes forms broadcasting connection to other nodes with trunk pipes in a DVB application.

39. The system according to claim 35, wherein one of the nodes is only coupled to each of the other nodes with a flow to form a pseudo-mesh connection while other four nodes are connected to form a two-fibre ring.

40. A data transmission method for implementing multiple service flow in a multiple service ring including a trunk pipe and at least two nodes each with at least one flow, said method comprising:
   a flow Rx framing step of receiving data from a flow and converting the received data into data packets of a predetermined protocol;
   a transmission setup step of setting-up information indicating the destination node address and destination flow for packets of said predetermined protocol to be transmitted; and
   a Tx framing step of encapsulating said information indicating the destination node address and destination flow and the packets of said predetermined protocol into frames of the multiple service ring and transmitting the same along said trunk pipe to a downstream neighbor node along the ring,
   wherein said multiple service ring is a dual-ring structure consisting of a pair of unidirectional count-rotating ringlets, said multiple service flow is based on RPR.

41. A data transmission method according to claim 40, wherein said predetermined protocol is a XP processing protocol, and said method further comprising:
   a Rx framing of receiving and de-framing data frames of the multiple service ring from a upstream neighbor node along said trunk pipe to obtain at least a destination node address and XP packets; and
   a transiting step of transiting the frames destined to other nodes so as to forward the frames destined to other nodes to a next node.

42. A data transmission method according to claim 41, further comprising:
   a destination flow determining step of determining a destination flow of the XP packets for a node with a Universally or Locally administered address; and
   a flow Tx framing step of converting said XP packets for node with a Universally or Locally administered address into data of format of local flow and sending the local flow data to a corresponding flow determined in said destination flow determining step.

43. The data transmission method according to claim 42, wherein said destination flow determining step includes a discriminating step of determining whether said received packets for a node with a Universally or Locally administered address are unicast, multicast or broadcast; a flow member copying step of making copies of the packets for each of the corresponding flow if multicast or broadcast is determined within a membership group in a node; and flow identifier determining step of determining destination flow from FT and FN fields in the received frames.

44. The data transmission method according to claim 43, wherein said transmission setup step sets up destination node address (NA), and FT and FN fields for indicating the type and NO. of the destination flow.

45. The data transmission method according to claim 44, further comprising a Tx scheduling step before the TX framing step for scheduling the transmission of data frames according to a priority of the frames, and decide which frame will go first to the downstream along the ringlet.

46. The data transmission method according to claim 45, further comprising a flow based protection (FBP) step for performing flow based protection to provide at least one flow to be used as a standby in case of failure of the used flows.

47. The data transmission method according to claim 46, wherein said FBP step provides 1+1 FBP to designate a mate Standby Flow with the same service property, source and sink in which payloads of the mate Working Flow and Standby Flow carries the same traffic, and once FBP occurred for this working flow, said standby will replace this working flow within 50 ms.

48. The data transmission method according to claim 46, wherein said FBP step provides 1:1 FBP to designate a mate Standby Flow with the same service property, source and sink in which payloads of the Standby Flow can run the other additional traffic, and once FBP occurred for this Working Flow, the additional traffic will be dropped out within 50 ms.

49. The data transmission method according to claim 46, wherein said FBP step provides 1:N FBP to designate a mate Standby Flow with the same service property, source and sink in which payloads of the Standby Flow runs the other additional traffic, and once FBP in one of N Working Flow occurred, this additional traffic will be dropped out within 50 ms.

50. The data transmission method according to claims 46, wherein said FBP step is for one of Ethernet and TCE.

51. The data transmission method according to claim 50, wherein said MSF uses Fairness arithmetic and supports both local address and global node address, said local address is PLAS that is an address of node link on the MSF ring and has local meaning only along the MSF ring.

52. The data transmission method according to claim 44, further comprising a frame sequence number generating step of generating frame sequence number sequentially with respect to a specified modulus for each of the data frames to be transmitted at the transmitting side; and
   at the receiving side, a FSN extracting step of extracting a FSN with respect to a peer-to-peer modulus from the received data frames; a counting step at the receiving side of counting the number of the received data frames; and a comparing step of comparing the counted frame number with the extracted FSN, if mismatch, an error reflecting transport performance is indicated.

53. The data transmission method according to claim 52, wherein said destination flow determining step gets at lease one of PT, PFI, a value of FT/CS/NM, FN and FSN from the received frames from the upstream node, and said transmission setup step attaches PT, PFI, a value of FT/CS/NM, FN and FSN into the data frames to be transmitted.

54. The data transmission method according to claim 53, wherein said Rx framing step, Tx framing step and the transiting step are of IEEE802.17 MAC layer; said flow Rx framing step, said transmission setup step, and said destination flow determining step, said FSN generating step, FSN extracting step, counting step, comparing step, and flow Tx framing step are of the XP layer.

55. The data transmission method according to claim 54, further comprising a flow adaptation function of the signal and rate transform, synchronous function between two sides of peer, and said flow adaptation function is of a flow processing layer.

56. The data transmission method according to claim 55, wherein said flow processing layer is a upper layer of said XP layer, said XP layer is a upper layer of said IEEE802.17 MAC layer, and corresponding interface functions are provided between the respective layers.

57. The data transmission method according to claim 54, further comprising a shaping step of generating a rate-limiting indication so as to reject excessive transmissions and avoid overflow, and said shaping step is of XP layer.

58. The data transmission method according to claim 42, wherein said frame includes at least one of a RPR header field, Extended protocol field, PT field, PFI field, Reserved fields, FT/CS/NM field, FN field, FSN field, HEC field, payload of XP, and XP payload FCS.

59. The data transmission method according to claim 42, wherein a network of said MSF is divided into a XP layer network that provides the transport of adapted information through a XP trail between XP access points and a MDL layer network that provides the transport of adapted information through a MDL trail between access points.

60. The data transmission method according to claim 59, further comprising a XP trail termination source step of accepting adapted information when inputting, adding the flow traffic, inserting CS or NM packets and presenting the characteristic information of the XP layer network when outputting, and a XP trail termination sink step of accepting the characteristic information of the XP layer network when inputting, terminating the flow traffic, extracting the CS or NM packets and presenting the adapted information when outputting, wherein said XP trail termination source step and sink step are of XP layer network.

61. The data transmission method according to claim 59, further comprising a MDL trail termination source step of accepting adapted information when inputting, inserting CS or NM packets and presenting the characteristic information of the MDL layer network when outputting, and a MDL trail termination sink step of accepting the characteristic information of the MDL layer network when inputting, removing the CS or NM packets and presenting the adapted information when outputting, wherein said MDL trail termination source step and sink step are of MDL layer network.

62. The data transmission method according to claim 59, wherein said MSF network provides the information transfer capability required to support various types of services of different bit rates by various server layers, and offers a XP trail and uses the XP trail in a server layer network.

63. The data transmission method according to claim 59, further comprising a XP/Client adaptation source step of performing the function of adding XP header between the inputting and outputting, and a XP/Client adaptation sink step of performing the function of remove XP header between the inputting and outputting.

64. The data transmission method according to claim 59, further comprising a MDL/XP adaptation source step of performing the functions of packet multiplexing and adding MDL header between its inputting and its outputting, and a MDL/XP adaptation sink step of performing the functions of packet de-multiplexing according to flow number value and MDL header extraction between its inputting and its outputting.

65. The data transmission method according to claim 59, wherein said MSF network provides a point-to-multipoint MDL Network Connection/Flow that multicasts customer traffic from single node to a group of nodes; and a point-to-multipoint XP Network Connection that multicasts customer traffic within a single node, from an MDL/XP adaptation sink to multiple XP/Server adaptation sinks.

66. The data transmission method according to claim 40, wherein said transiting step transits the frames destined to other nodes at a fast and almost fixed rate.

67. The data transmission method according to claim 40, wherein said flows include at least one of Ethernet, TDM Circuit Emulation including the emulation of G.707 SDH circuit—Transport of TU-11, TU-12 or TU-2, G.702 PDH circuit—Synchronous and asynchronous circuit transport, Video signal, Voiceband signal, Digital channel supported by 64 kbit/s-based ISDN, and an trunk pipe of other MSR span with a lower rate than that of this trunk pipe.

68. The data transmission method according to claim 40, further comprising: a flow based multicasting step of duplicating data frames from a source flow getting a payload of the frame to other multiple flows with the same FT field value within a node.

69. The data transmission method according to claim 40, further comprising: a bandwidth limiting step of providing bandwidth limitation to a specific flow.

70. The data transmission method according to claim 40, further comprising: a merging step of merging plural flows of the same FT field value to form a flow merging group (FMG) similar to one logical link.

71. The data transmission method according to claim 40, further comprising: a line speed filtering step of filtering and classifying frames based on certain protocol fields of upper layer in the payload of frame.

72. The data transmission method according to claim 40, further comprising: a flow mirroring step of monitoring the incoming or outgoing traffic on a related flow by connecting a sniffer to a "mirrored to" flow.

* * * * *

UNITED STATES PATENT AND TRADEMARK OFFICE
CERTIFICATE OF CORRECTION

PATENT NO.         : 7,486,614 B2                                              Page 1 of 1
APPLICATION NO. : 10/521999
DATED              : February 3, 2009
INVENTOR(S)        : Shaohua Yu It is certified that error appears in the above-identified patent and that said Letters Patent is hereby corrected as shown below:

Title page, col. 1, under (30) Foreign Application Priority Data, delete "(WO)" and insert -- CN --.

Title page, col. 2, under Other Publications, line 4, delete "Resillient" and insert -- Resilient --.

Col. 53, line 41, delete "means" and insert -- module --.

Col. 53, line 48, delete "means" and insert -- module --.

Col. 53, line 50, delete "means" and insert -- module --.

Col. 53, line 54, delete "means" and insert -- module --.

Col. 53, line 57, delete "means" and insert -- module --.

Col. 53, line 60, delete "means" and insert -- module --.

Col. 54, line 46, delete "means" and insert -- module --.

Col. 54, line 49, delete "means" and insert -- module --.

Col. 54, line 53, delete "means" and insert -- module --.

Col. 54, line 54, delete "means" and insert -- module --.

Col. 54, line 55, delete "means" and insert -- module --.

Col. 55, line 6, delete "lease" and insert -- least --.

Col. 55, line 8, delete "EN" and insert -- FN --.

Col. 55, line 64, delete "means" and insert -- module --.

Col. 58, line 42, delete "lease" and insert -- least --.

Signed and Sealed this

Ninth Day of February, 2010

David J. Kappos
*Director of the United States Patent and Trademark Office*